United States Patent
Mohan et al.

(10) Patent No.: US 9,323,233 B2
(45) Date of Patent: Apr. 26, 2016

(54) BUILDING LOAD REDUCTION DURING DEMAND RESPONSE

(71) Applicants: Tanuj Mohan, Mountain View, CA (US); Premal Ashar, Sunnyvale, CA (US)

(72) Inventors: Tanuj Mohan, Mountain View, CA (US); Premal Ashar, Sunnyvale, CA (US)

(73) Assignee: enLighted, Inc., Sunnyvale, CA (US)

( * ) Notice: Subject to any disclaimer, the term of this patent is extended or adjusted under 35 U.S.C. 154(b) by 570 days.

(21) Appl. No.: 13/740,205

(22) Filed: Jan. 13, 2013

(65) Prior Publication Data

US 2013/0184892 A1 Jul. 18, 2013

Related U.S. Application Data

(63) Continuation-in-part of application No. 13/360,786, filed on Jan. 29, 2012, now Pat. No. 9,002,522.

(60) Provisional application No. 61/586,812, filed on Jan. 15, 2012.

(51) Int. Cl.
*G05B 13/02* (2006.01)
*G05B 15/02* (2006.01)

(52) U.S. Cl.
CPC .............. *G05B 13/02* (2013.01); *G05B 15/02* (2013.01); *G05B 2219/2642* (2013.01)

(58) Field of Classification Search
None
See application file for complete search history.

(56) References Cited

U.S. PATENT DOCUMENTS

| | | |
|---|---|---|
| 5,101,141 A | 3/1992 | Warner et al. |
| 5,179,324 A | 1/1993 | Audbert |
| 5,191,265 A | 3/1993 | D'Aleo et al. |
| 5,283,516 A | 2/1994 | Lohoff |
| 5,812,422 A | 9/1998 | Lyons |
| 6,057,654 A | 5/2000 | Cousy et al. |
| 6,188,181 B1 | 2/2001 | Sinha et al. |
| 6,342,994 B1 | 1/2002 | Cousy et al. |
| 6,548,967 B1 | 4/2003 | Dowling et al. |
| 7,309,985 B2 | 12/2007 | Eggers et al. |
| 7,348,736 B2 | 3/2008 | Piepgras et al. |
| 7,437,596 B2 | 10/2008 | McFarland |
| 7,528,503 B2 * | 5/2009 | Rognli et al. ................... 307/62 |
| 7,550,931 B2 | 6/2009 | Lys et al. |
| 7,566,137 B2 | 7/2009 | Veskovic |
| 7,623,042 B2 | 11/2009 | Huizenga |
| 7,792,956 B2 | 9/2010 | Choong et al. |
| 7,925,384 B2 | 4/2011 | Huizenga et al. |
| 2004/0002792 A1 | 1/2004 | Hoffknecht |
| 2005/0169643 A1 | 8/2005 | Franklin |
| 2006/0275040 A1 | 12/2006 | Franklin |
| 2007/0057807 A1 | 3/2007 | Walters et al. |
| 2007/0061050 A1 | 3/2007 | Hoffknecht |
| 2007/0086128 A1 | 4/2007 | Lane et al. |
| 2007/0215794 A1 | 9/2007 | Cernasov et al. |
| 2008/0244104 A1 | 10/2008 | Clemente |
| 2008/0265796 A1 | 10/2008 | Null et al. |

(Continued)

*Primary Examiner* — Sean Shechtman
*Assistant Examiner* — Steven Garland
(74) *Attorney, Agent, or Firm* — Brian R. Short

(57) ABSTRACT

Apparatuses, methods and systems for managing a building load reduction of a plurality of loads within a building are disclosed. One method includes assigning one or more loads of the plurality of loads to logical groups, assigning a sensitivity coefficient to each of the logical groups, wherein the sensitivity coefficient is directly proportional to an impact on occupants in the building to load changes, determining the baseline load for each of the logical groups, receiving a power reduction demand response, and reducing a load of each logical group based upon the sensitivity coefficient.

19 Claims, 16 Drawing Sheets

Demand Response Signal

(56) References Cited

U.S. PATENT DOCUMENTS

| | | |
|---|---|---|
| 2009/0026966 A1 | 1/2009 | Budde et al. |
| 2009/0179596 A1 | 7/2009 | Willaert et al. |
| 2009/0195161 A1 | 8/2009 | Lane et al. |
| 2010/0034386 A1 | 2/2010 | Choong et al. |
| 2010/0135186 A1 | 6/2010 | Choong et al. |
| 2010/0264846 A1 | 10/2010 | Chemel et al. |
| 2010/0270933 A1 | 10/2010 | Chemel et al. |
| 2010/0295482 A1* | 11/2010 | Chemel et al. ............... 315/312 |
| 2011/0031897 A1 | 2/2011 | Henig et al. |
| 2011/0166710 A1* | 7/2011 | Kordik et al. ............... 700/277 |
| 2012/0078432 A1* | 3/2012 | Weatherhead et al. ....... 700/295 |
| 2012/0194352 A1* | 8/2012 | Ellis et al. .................... 340/907 |

* cited by examiner

Designating the building fixture as belonging to a logical group of building fixtures, wherein the designating comprises at least one of receiving the designation or the building fixture aiding in the designation

910

Independently controlling, by the building control fixture, at least one of an environmental load or a security device

920

Sharing, by the building control fixture, at least one of sensor or state information with other building fixtures within the logical group of building fixtures, through a communication port of the building control fixture

Each of a plurality of independently controlled lighting fixtures sensing light and/or motion, and independently controlling an intensity of light of the lighting fixture
1510

Specifying one or more of the plurality of independently controlled lighting fixtures as belonging to a logical group
1520

Each of the lighting fixtures of the logical group additionally controlling the intensity of light of the lighting fixture based on sensing of light and/or motion of another lighting fixture of the logical group
1530

FIGURE 15

Each of a plurality of independently controlled temperature apparatuses sensing light, motion and/or temperature, and independently controlling a temperature
1610

Specifying one or more of the plurality of independently controlled temperature apparatuses as belonging to a logical group
1620

Each of the temperature apparatuses of the logical group additionally controlling temperature based on sensing of light, motion and/or temperature of another temperature apparatus of the logical group
1630

FIGURE 16

BUILDING LOAD REDUCTION DURING DEMAND RESPONSE

RELATED APPLICATIONS

This patent application is a continuation-in-part (CIP) of U.S. patent application Ser. No. 13/360,786, filed on Jan. 29, 2012, titled "Logical Groupings of Intelligent Building Structure", and claims priority to U.S. provisional patent application Ser. No. 61/586,866, filed on Jan. 15, 2012, which are herein incorporated by reference.

FIELD OF THE EMBODIMENTS

The described embodiments relate generally to power loads. More particularly, the described embodiments relate to apparatuses, methods and systems of a building load reduction during a demand response.

BACKGROUND

Utility companies see variable demand for electricity around the year. There are certain intervals of peak demand, usually during summer afternoons and other times when the demand is above average. During periods of peak demand, utility companies provide incentives to consumers to reduce their electricity demand (via Demand Response Requests). Consumers on their part, take steps to reduce their electricity consumption during these time intervals (also called as Demand Response Events). The Demand Response Request either specifies an absolute reduction in electricity consumption (load) or a relative reduction or specifies an enhanced per-unit unit price during the Event, which the consumer can translate into an absolute load reduction number.

Today's techniques are static in nature and are pre-configured for a fixed behavior. For example, in a department store every other light fixture might be turned off or the thermostat temperature set points changed during a Demand Response Event. These measures do not account for the current occupancy of the store and might impact sales. It would be a lot more desirable to keep the occupied aisles full bright and dim unoccupied spaces. Similarly based on the occupancy of the store the amount of air changes per hour might be adjusted enabling untapped HVAC savings.

A significant part of the electricity consumption for any consumer is due to the lighting loads. Hence consumers allocate a part of the load reduction during Demand Response Events to reduction of lighting loads. Electrical lighting is virtually a necessity in any work environment, and reducing the lighting load either by dimming or switching off lights can impact the productivity of the workers and the usability of the space. Lighting loads are ubiquitous in the built environment. All areas at a building site are not equally affected by changing light levels. For example, work being done in areas such as laboratories or executive rooms is likely to be more important and critical to the establishment than work being done in areas such as break rooms or corridors. Secondly, minimum illumination requirements are not uniform across all areas. Safety requirements often dictate a minimum illumination level in certain areas though not in others. The differing minimum and average illumination requirements in various areas mean that any potential lighting load reduction during a Demand Response Event cannot be uniform across all lighting loads. The load reduction in critical areas needs to be less as compared to the load reduction in non-critical areas.

Similarly, during Demand Response Events a part of the overall load reduction is obtained from other electricity consuming devices such as HVAC equipment, computing equipment and so on. Much like lighting, not all HVAC equipment or computing equipment is treated equally when it comes to load reduction. Some of the equipment may be more important for the organization goals, and proportionally lesser load reduction needs to be obtained from such equipment.

It is desirable to have methods, systems and apparatuses for distribution of an overall load reduction in a building with special emphasis on individual lighting loads.

SUMMARY

One embodiment includes a method of managing a building load reduction of a plurality of loads within a building. The method includes assigning one or more loads of the plurality of loads to logical groups, assigning a sensitivity coefficient to each of the logical groups, wherein the sensitivity coefficient is directly proportional to an impact on occupants in the building to load changes, determining the baseline load for each of the logical groups, receiving a power reduction demand response, and reducing a load of each logical group based upon the sensitivity coefficient.

Another embodiment includes a system for managing a power load reduction. The system includes a plurality of loads and a demand response (DR) controller. The DR controller is operative to assign groups of one or more of the plurality of loads to logical groups, assign a sensitivity coefficient to each logical group of the plurality of logical groups, wherein the sensitivity coefficient is directly proportional to an impact on occupants in a building to changes in a power load of the logical group, determine a baseline power load for each of the logical groups, and reduce a power load within the building upon receiving a power reduction demand response. Reducing the power load within the building includes reducing a power load of each logical group based upon the sensitivity coefficient and the baseline load of the logical group.

Another embodiment includes a demand response controller. The demand response controller includes a controller operative to assign groups of one or more of the plurality of loads to logical groups, assign a sensitivity coefficient to each logical group of the plurality of logical groups, wherein the sensitivity coefficient is directly proportional to an impact on occupants in a building to changes in a power load of the logical group, determine a baseline power load for each of the logical groups, and reduce a power load within the building upon receiving a power reduction demand response. Reducing the power load within the building includes reducing a power load of each logical group based upon the sensitivity coefficient and the baseline load of the logical group.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 9 is a flow chart that includes steps of an example of a method of operating a building control fixture according to an embodiment.

FIG. 15 is a flow chart that includes steps of another example of a method of an intelligent light controller controlling a light.

FIG. 16 is a flow chart that includes steps of another example of a method of an intelligent light controller controlling a light.

DETAILED DESCRIPTION

The described embodiments are embodied in an apparatuses, systems and methods for a managing a building load reduction of a plurality of loads within a building. The described embodiments include distributing electric load reduction in response to an external Demand Response Signal. Detailed environment information including energy usage, occupancy and temperature, available via networked sensors, allow for a dynamically optimized load reduction in the building. The load reduction leverages real-time environment information and occupant input to optimally balance energy usage with occupant satisfaction/needs. Sensors and loads are logically grouped together and assigned a 'Demand Response Sensitivity Coefficient'. These sensors communicate bi-directionally with a controller. The controller receives a Demand Response Signal specifying the total load reduction. Based on the current load, the controller computes the load reduction that needs to be obtained and communicates this to various loads. The controller continually monitors the actual load consumption and compares the actual overall load reduction with the target overall load reduction, and takes corrective action as necessary. An embodiment includes a method for distribution of total target load reduction among individual loads so as to minimize disruption to users and maximize productivity.

Figure 1:
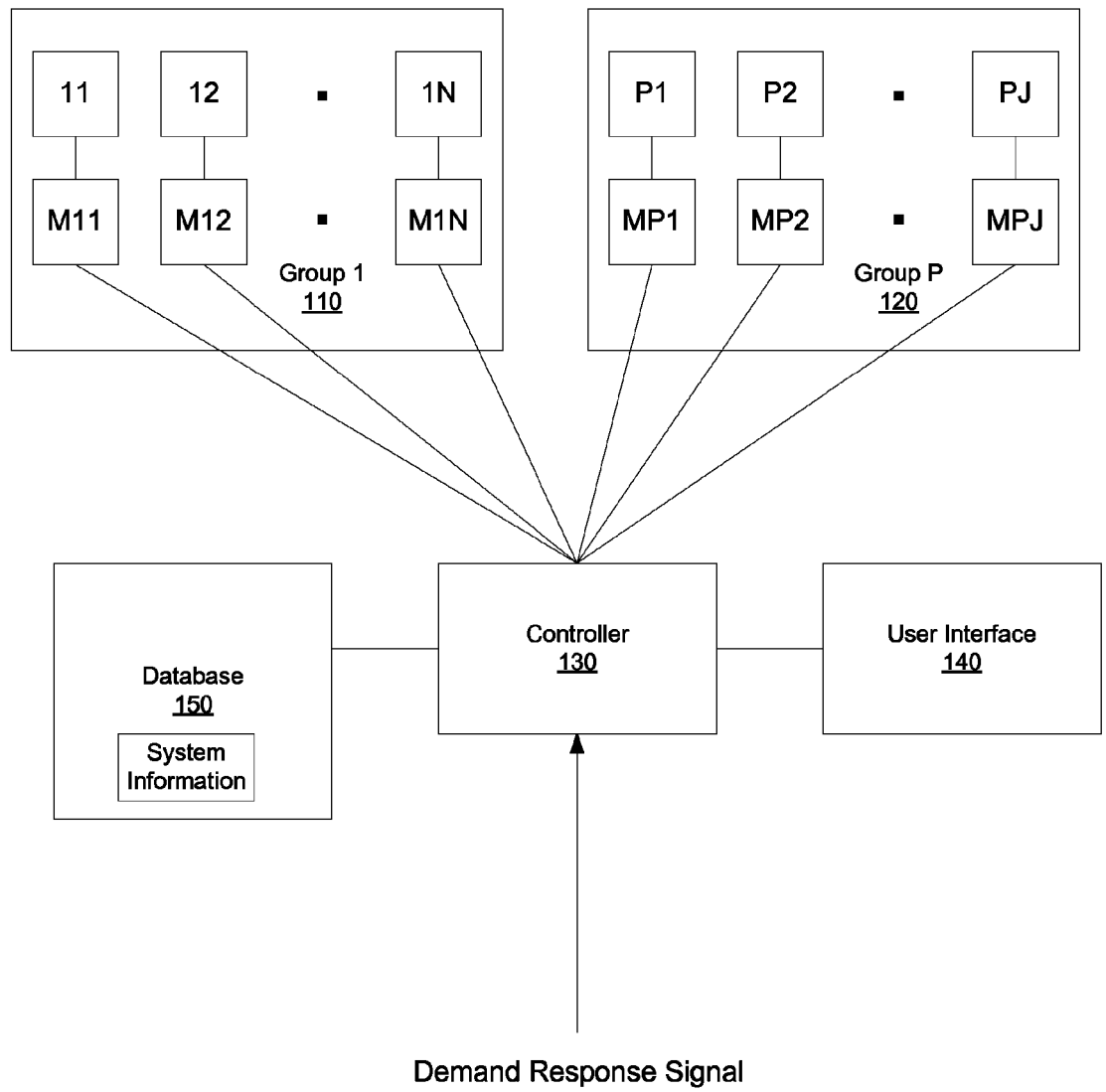
FIG. 1 shows a system for managing a building load reduction of a plurality of loads, according to an embodiment.

FIG. 1 shows a system for managing a building load reduction of a plurality of loads, according to an embodiment. This embodiment includes multiple logical groups 110, 120, wherein each logical groups includes one or more loads. A first logical group 110 includes N loads 11, 12, 1N, and a Pth logical group 120 includes M loads P1, P2, . . . PJ. There could be different number of loads in each group. For this embodiment, each of the loads is connected to a Measurement, Control & Communication Unit (MCCU) M11-M1N, . . . , MP1-MPJ.

For at least some embodiments, each MCCU performs one or more measurement functions including measurement of the power consumed by the corresponding load, sensing the motion (occupancy) in proximity of the load, measuring the ambient light, ambient temperature, ambient Carbon Dioxide ($CO_2$) levels, etc. Additionally, for at least some embodiments, each MCCU control the load to which it is connected. For an embodiment, this translates into controlling the intensity of the light (in case of lighting loads), the volume/temperature of the air (in the case of an HVAC load) and so on. Finally, an embodiment of the MCCU communicates bi-directionally with a controller 130 over a communication network, which could be a wired or wireless network.

For an embodiment, the controller 130 is connected to a Database 150 which is capable of storing System Information. For an embodiment, a User Interface 140 is used to enter or modify the System Information stored in the Database 150. The Controller 130 can receive and interpret Demand Response Signals from any entity including an external entity.

For an embodiment, each MCCU measures the power consumed by the corresponding load at regular time intervals and communicate this power measurement to the Controller 130. The Controller 130 stores the periodically received power measurements from all the loads in the Database 150, as a part of the System Information. The System Information also stores the association of each load with the respective logical group to which the load belongs.

Specifically in the context of lighting loads, minimum illumination requirements are not uniform across all areas of the site. The minimum and average illumination requirements in critical areas are likely to be more than the requirements in non-critical areas. The impact on productivity and work output of dimming or switching off lighting loads differs from one logical group to another. Demand Response signals received by the controller imply an overall reduction in total load by a certain amount during the specific time interval. This reduction in total load is to be distributed across the individual loads in a manner that has a minimal impact on the productivity of the organization. Thus the load reduction in critical areas needs to be proportionally less as compared to the load reduction in non-critical areas. For example critical areas such as laboratories and executive rooms need to see proportionally a lesser load reduction as compared to break rooms and lavatories during Demand Response Events. Secondly, the load reduction in occupied areas should be proportionally less than the load reduction in unoccupied areas.

Defining a Demand Response Sensitivity Coefficient (DRSC) for each logical group allows a quantification of the relative criticality of the logical group and therefore allows appropriate distribution of load reduction across groups. The DRSC of a logical group is inversely related to the impact on the productivity resulting from a unit percentage reduction in load for that logical group. For an identical percentage reduction in load of two groups, the group with the higher DRSC provides lesser impact on productivity than the group with lower DRSC.

Users of the system are able to use the User Interface 140 to enter information that forms part of the System information. One aspect of this information is the 'Demand Response Sensitivity Coefficient' (DRSC) for each group which can be set or modified by the users from the User Interface 23. For an embodiment, a group of loads that is considered critical is assigned low DRSC while the non-critical groups are assigned a high DRSC.

For an embodiment, during Demand Response Events, the load reduction is computed as the difference between the actual electricity consumption during the Demand Response Event and the 'Baseline Load'. For an embodiment, the 'Baseline Load', is defined as the average load during the same time interval computed over several prior days in the absence of Demand Response Events. Normally, working days are considered in the computation of the 'Baseline Load' if the Demand Response Event is on a working day.

During a Demand Response Event it can also be desirable to have the lighting loads locally optimize their Demand Response savings based on their current environment and occupancy conditions. It should be noted that under changing environmental conditions (e.g. new occupancy, changing available daylight) that the load might need to increase its electricity consumption.

For at least some embodiments, in order to distribute the total load reduction over individual load groups, if two logical groups have identical baseline loads, the load reduction should be higher for the logical group with the higher DRSC, and if two logical groups have identical DRSC, the load reduction should be higher for the group with the higher baseline load.

At least some embodiments include linear functions such that if two logical groups have identical baseline loads, the load reduction is directly proportional to DRSC, and if two groups have identical DRSC, the load reduction is directly proportional to the baseline load.

For at least one embodiment, given a total target load reduction for the Demand Response Event, it is possible to compute the percentage load reduction for each logical group as follows:

$$Pg = (Dg * (T / \Sigma(Bi * Di))) * 100\%$$

Where
Pg=percentage reduction of the load in group 'g'. (This percentage applies equally to all loads in that group).
Dg=DRSC of the group 'g'
T=Total target load reduction
Bi=Baseline load of group i
Di=DRSC of group i.

The group-wise percentage reduction is applied to each of the loads in the specific groups to cumulatively provide the total target load reduction during the Demand Response Event.

In one variation of the above method specific to the case of lighting loads, users are also able to specify a minimum lighting level for each lighting load as a part of the System Information. If the load reduction computed as per above formula requires the lighting to be dimmed to a level lower than the minimum lighting level specified, the light is dimmed only to the minimum specified level.

The MCCU continues to monitor the load consumption of each load and report it to the Controller 130. Based on the observed actual load reduction, the controller can take suitable action for subsequent greater or lesser load reduction if required to achieve the specified target.

In one manifestation of the system occupancy sensors are part of the MCCU connected to loads. The MCCU can control the load depending on the level of occupancy in that particular area. For example in the case of lighting loads, MCCU can turn off or dim the lighting load in response to lack of occupancy. In the case of HVAC loads, the fan speed/target temperature can be suitably set during periods where there is no occupancy. One variation of this manifestation is to dim the lighting loads faster than usual based on lack of occupancy thereby achieving greater overall load reduction. In another embodiment ambient light sensors are part of the MCCU connected to loads and utilize available daylight to dim/turn off the lights aggressively during a DR event.

Accordingly, an embodiment includes system for managing a power load reduction includes a plurality of loads, and a demand response (DR) controller. Further, the DR controller is operative to assign groups of one or more of the plurality of loads to logical groups, assign a sensitivity coefficient to each logical group of the plurality of logical groups, wherein the sensitivity coefficient is directly proportional to an impact on occupants in a building to changes in a power load of the logical group, determine a baseline power load for each of the logical groups, and reduce a power load within the building upon receiving a power reduction demand response. The reduction in power load is accomplished by reducing a power load of each logical group based upon the sensitivity coefficient and the baseline load of the logical group.

As described, an embodiment further includes the plurality of the loads sensing a parameter (such as, light or motion) continuously over time, thereby providing re-distribution of the power loads continuously over time. An embodiment further includes maintaining a power load target reduction over a target period, including continuously adapting to sensed parameter changes redistributed throughout the logical groups and power loads of the logical groups, based on the sensitivity coefficients and baseline loads of the logical groups.

Figure 2:
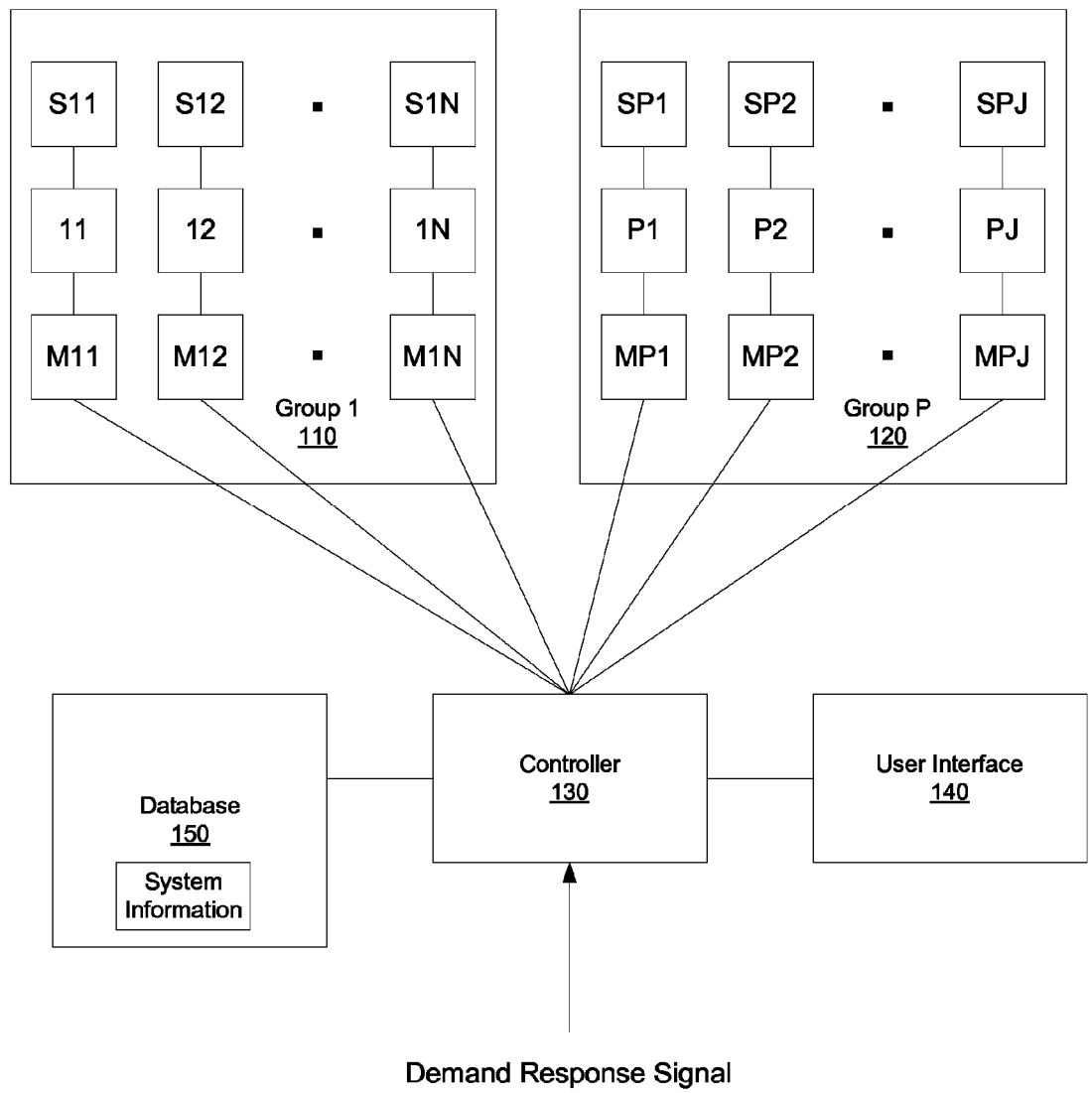
FIG. 2 shows a system for managing a building load reduction of a plurality of loads, according to another embodiment.

FIG. 2 shows a system for managing a building load reduction of a plurality of loads, according to another embodiment. This embodiment is similar to the embodiment of FIG. 1, but further depicts each of the loads having a sensor (S11-S1N, SP1-SPJ) for sensing a parameter. As described, the sensors sense a parameter that for some embodiments is used to further adjust a power load of one or more of the loads.

For an embodiment, the sensor includes an occupancy sensor, such as a motion sensor. Further, the occupancy sensors allow for adjusting the electricity of various different types of load including lighting, HVAC and plug-loads. Upon detecting vacancy, lights can be turned off or dimmed, HVAC can be setback and certain plug-loads such as computer monitors, task lights etc. can be turned off.

For at least some embodiments, the sensor includes a temperature sensor and a CO2 sensor. The temperature and/or CO2 sensors along with occupancy sensors can be utilized to help optimize the HVAC savings.

Ambient light sensors allow for lighting loads to leverage ambient light and during DR events do so more aggressively. Ambient light sensors can also be leveraged to detect occupancy.

Figure 3:
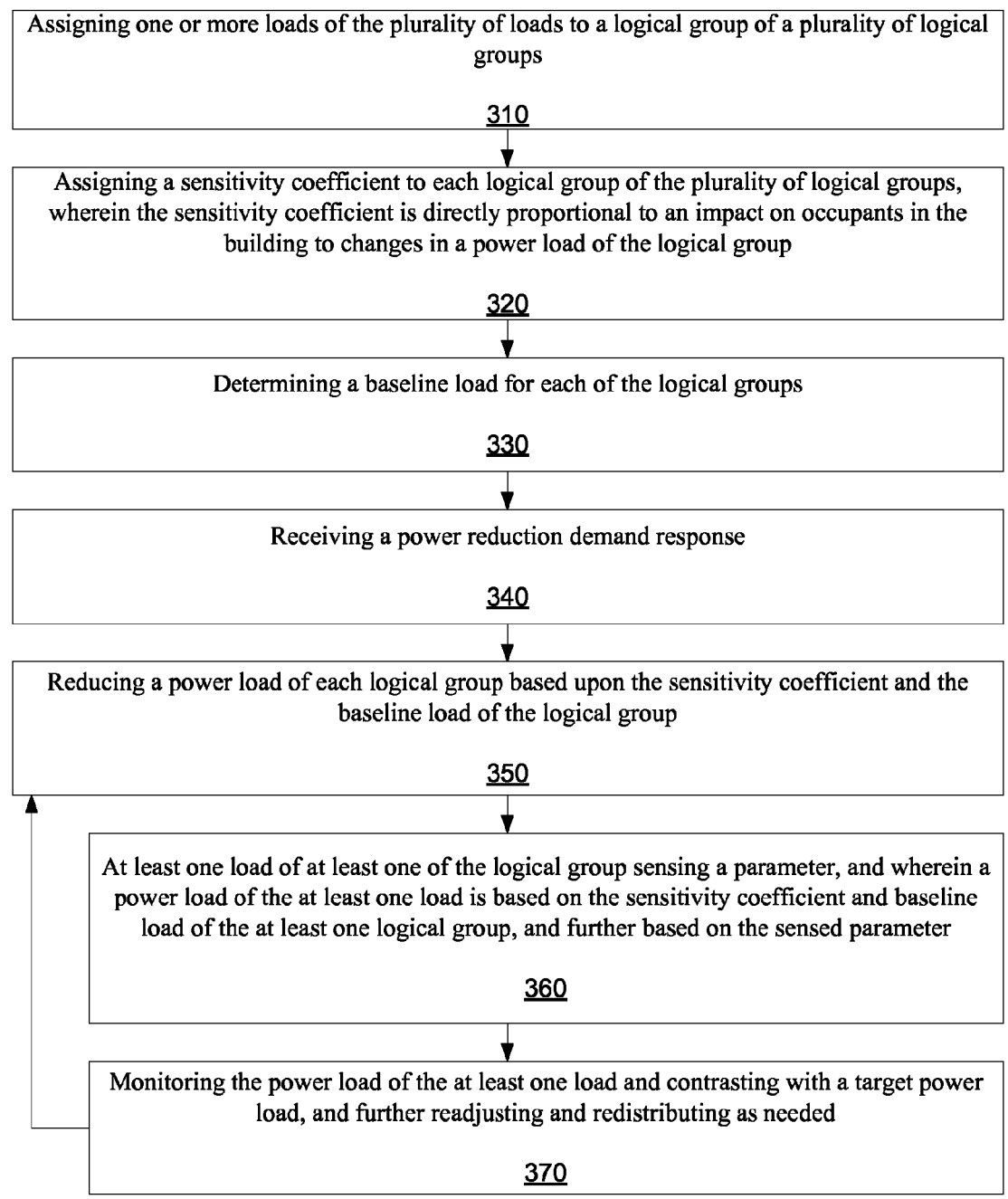
FIG. 3 is a flow chart that includes steps of a method of managing a building load reduction of a plurality of loads, according to an embodiment.

FIG. 3 is a flow chart that includes steps of a method of managing a building load reduction of a plurality of loads, according to an embodiment. A first step 310 includes assigning one or more loads of the plurality of loads to a logical group of a plurality of logical groups. A second step 320 includes assigning a sensitivity coefficient to each logical group of the plurality of logical groups, wherein the sensitivity coefficient is directly proportional to an impact on occupants in the building to changes in a power load of the logical group. A third group 330 includes determining a baseline load for each of the logical groups. A fourth step 340 includes receiving a power reduction demand response. A fifth step 350 includes reducing a power load of each logical group based upon the sensitivity coefficient and the baseline load of the logical group.

The assignment of the sensitivity coefficient can be user driven, or automatically generated based on sensing of parameters associated with the load. For an embodiment, the sensitivity coefficient determines the relative distribution of power load reduction of a plurality of logical groups of loads, wherein the sensitivity coefficient determines how much each of the power loads of each of the logical groups is adjusted. Generally, the value of the sensitivity coefficient is dependent upon how the power load reduction impacts occupants of the structure in which the logical group of loads is located. However, other factors can additionally or alternatively be factored into the value of the sensitivity coefficient.

Each of the loads generally includes an electronic device, such as, a lighting fixture or an HVAC device. However, the loads can include other power consuming devices. The power load of each of the loads or logical groups of loads represents the power dissipation of the load or logical group of loads. For an embodiment, the power load includes an electrical load.

At least some embodiments further include a sixth step 360 that includes at least one load of at least one of the logical group sensing a parameter, and wherein a power load of the at least one load is based on the sensitivity coefficient and baseline load of the at least one logical group, and further based on the sensed parameter. At least some embodiments further include a seventh step 370 that includes monitoring the power load of the at least one load and contrasting with a target power load, and further readjusting and redistributing as needed. As shown in FIG. 3, the step 350 can be re-executed after the step 370.

As described, an embodiment further includes at least one load of at least one of the logical group sensing a parameter, and wherein a power load of the at least one load is based on the sensitivity coefficient and baseline load of the at least one logical group, and further based on the sensed parameter. For an embodiment, the further includes a plurality of the loads sensing the parameter continuously over time, thereby providing re-distribution of power loads continuously over time. For an embodiment, the further includes maintaining a power load target reduction over a target period, including continuously adapting to sensed parameter changes redistributed throughout the logical groups and power loads of the logical groups, based on the sensitivity coefficients and baseline loads of the logical groups.

For an embodiment, the sensitivity coefficient is user specified. For another embodiment, the sensitivity coefficient is adaptively learned. The sensitivity coefficient can be learned, for example, by monitoring occupancy of a location of a logical group over time.

For an embodiment, one or more of the loads includes a light. For other embodiments, one or more of the loads includes an environmentally controlling device within the building, such as, and HVAC device.

As previously described, for an embodiment, the sensitivity coefficient includes the DRSC. For an embodiment, the sensitivity coefficient is selected for an area or a logical group, and is based, for example, on lighting specifications that represent such an impact of lighting on productivity. It is to be understood that the load can be reduced based on the either the sensitivity coefficient or the baseline load individually.

For an embodiment, assigning logical groups includes identifying a commonality between the one or more loads of the plurality of loads. Examples of commonality include, for example, loads located in common areas, common in proximity, commonly observed behavior (for example, sensed motion, sensed temperature, or common timers).

For an embodiment, assigning a sensitivity coefficient comprises determining an impact of the power load of the logical group to the users who utilize the loads of the logical group, wherein the sensitivity coefficient for each logical group is inversely related to a loss in productivity of an organization for a unit percentage reduction in a lighting load of the logical group. For an embodiment, the load comprises a light, and the power load comprises an amount of power consumed by the light.

For an embodiment, determining a baseline power load for each of the logical groups comprises monitoring a power load of the logical group over a period of time.

For an embodiment, if two logical groups have substantially identical baseline loads, then reducing the load of each logical group proportional to the sensitivity coefficient of the logical group.

For an embodiment, if two logical groups have substantially identical sensitivity coefficients, then reducing the load of each logical group proportional to the baseline power load of the logical group.

An embodiment further includes specifying a minimum power load for each of the logical groups, wherein the minimum power load preempts the reduced load of each logical group based upon at least one of the sensitivity coefficient and the baseline power load of the logical group, and limits the reduction of the power load of the logical group.

An embodiment further includes monitoring a load consumption for each logical group, and increasing or decreasing the load if required to achieve a specified load target. That is, once the initial power reduction is achieved, the space utilization (associated with the logical group) might change—for e.g. conference rooms or aisles in a store might get occupied or vacated changing the current load of the logical group or changing ambient due to sunlight coming in. Monitoring detects this change and adaptively re-distributes the reduction needed across the logical groups.

An embodiment further includes sensing occupancy of areas of each logical group, and further comprising reducing the load to logical groups that do not sense occupancy upon receiving the power reduction demand response. An embodiment further includes sensing occupancy of areas of each logical group, and further comprising accelerating reducing the load to logical groups that do not sense occupancy upon receiving the power reduction demand response.

An embodiment further includes sensing occupancy of areas of each logical group, initiating an occupancy timer upon sensing occupancy and further comprising reducing the load to a logical group upon receiving the power reduction demand response at a first rate if received during a time period of the occupancy timer, and reducing the load to the logical group upon receiving the power reduction demand response at a second rate if received after the time period of the occupancy timer, wherein the second rate is faster than the first rate.

Figure 4:
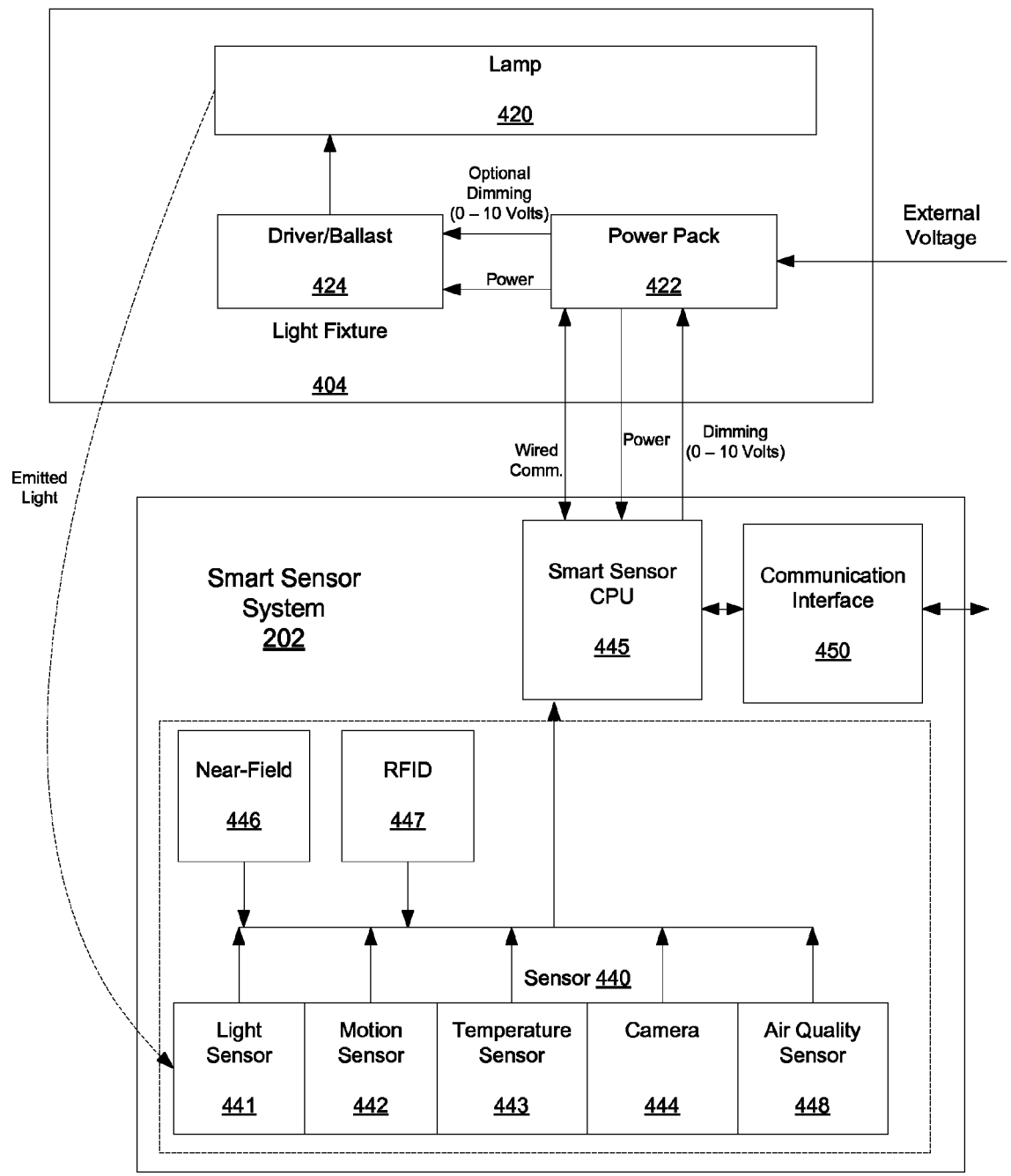
FIG. 4 shows a load, according to an embodiment.

FIG. 4 shows a load, according to an embodiment. The load of FIG. 4 includes an intelligent light fixture. Here, the intelligent light fixture includes a light fixture 404 and a smart sensor system 402. For this embodiment, the light fixture 404 includes a lamp 420, a driver 424 and a power pack 422.

The power pack 422 receives an external voltage which provides power to the light fixture 404 and the smart sensor system 402. Additionally, the power pack 422 receives dimming control from the smart sensor system 402. Based on control information from the smart sensor system 402, the power pack 422 provides dimming control (again, the dimming control is optional) and power to the driver 424. The driver 424 can include an LED driver, or a florescent light ballast.

The driver 424 controls the applied voltage or current to the lamp (light) 420 which controls an intensity of light emitted from the lamp 420. As described, the lamp can include any type of light, such as, LED, incandescent, HID, or florescent.

The emitted light is received by a light sensor 441 of the smart sensor system 402. For an embodiment, a smart sensor CPU 445 of the smart sensor system 402 monitors the received light intensity. Additionally, for at least some embodiments, the smart CPU 445 controls the dimming of the lamp 420. By being able to control the lamp 420 and monitor the emitting intensity of light from the lamp 420, the smart sensor system 402 is able to monitor the power usage of the lamp 420, and monitor the health of the light fixture 404.

As shown, the smart sensor system 402 includes a sensor 440 that includes, for example, the light sensor 441 (for example, an ambient light sensor), a motion sensor 442, a temperature sensor 443, a camera 444, an air quality sensor 448, a near-field sensor 446, and/or an RFID sensor 447. The sensor 440 provides the sensed information to the smart sensor CPU 445.

For an embodiment, the smart sensor CPU 445 monitors sensed parameters as provided by one or more of the sensors connected to the smart sensor CPU 445. The smart sensor CPU 445 can then directly adjust the power load of the intelligent light fixture, or communicates the sensor information through, for example, the communication interface 450, to another controller, thereby allowing the power load of the load (intelligent light fixture) to be adaptively adjusted.

Figure 5:
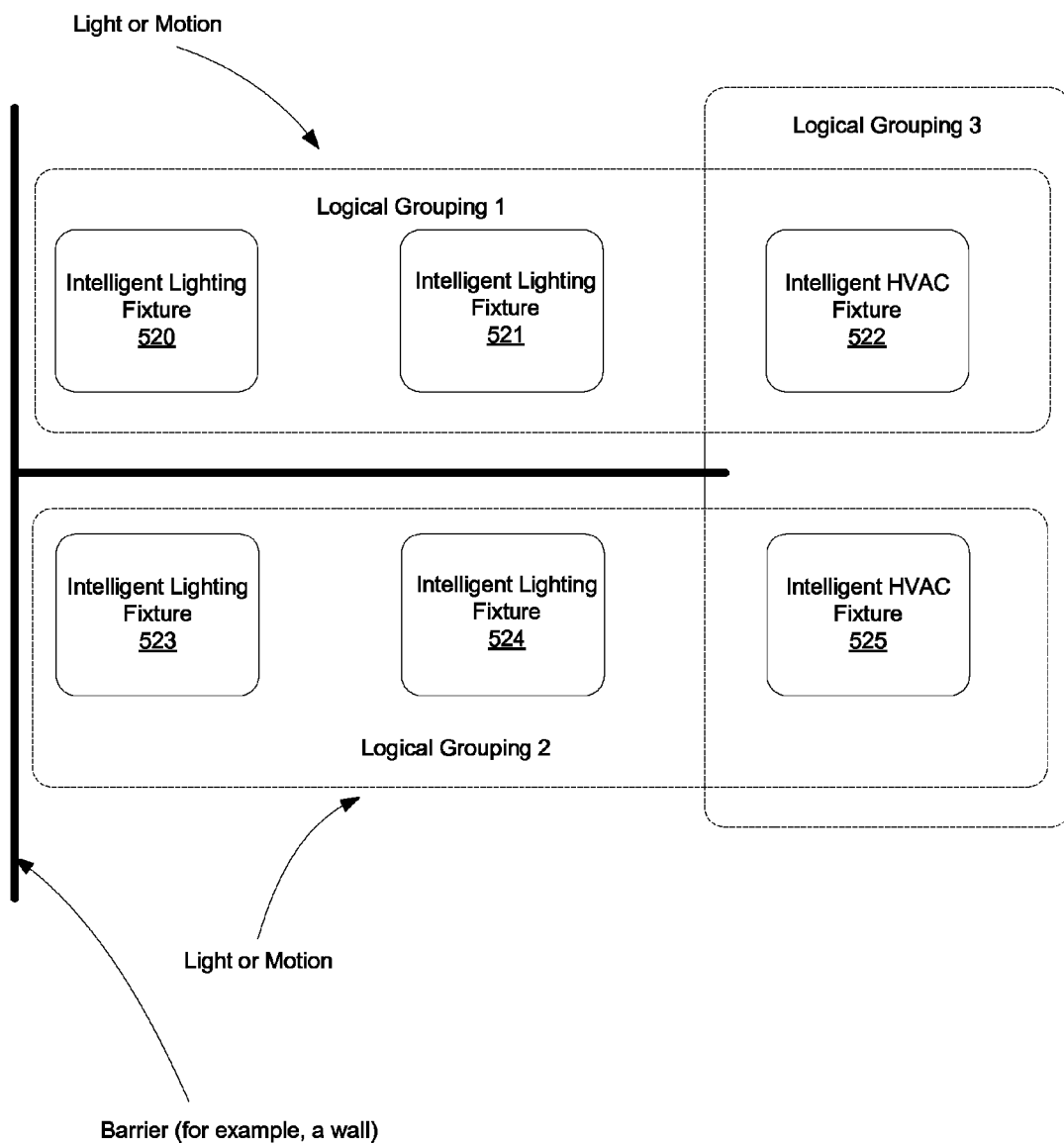
FIG. 5 shows logical groups of loads, according to an embodiment.

FIG. 5 shows logical groups of loads, according to an embodiment. Again, for this particular embodiment the loads include intelligent light fixtures 520, 521, 523, 524. Further, the loads include intelligent HVAC (heating, ventilation, and air conditioning) systems 522, 525. It is to be understood that these are provided as exemplary load. Many other types of loads are possible.

As shown, a first logical group includes intelligent light fixtures 520, 521 and HVAC device 522. A second logical group includes intelligent light fixtures 523, 524 and HVAC device 525. A third logical group includes HVAC device 522 and HVAC device 525. For at least some embodiments, a sensed parameter a load of a logical group influences the behavior of another load within the logical group. Based on a received demand response, the power load of one or more of the logical groups may be decreased—attempting to adjust the power load to a target level. Based on sensed parameters, the power loads within each of the logical groups adapt their power load. The parameters may be sensed over time, allowing the loads of the logical groups to adaptively adjust their power loads to be closer or below the target level.

Figure 6:
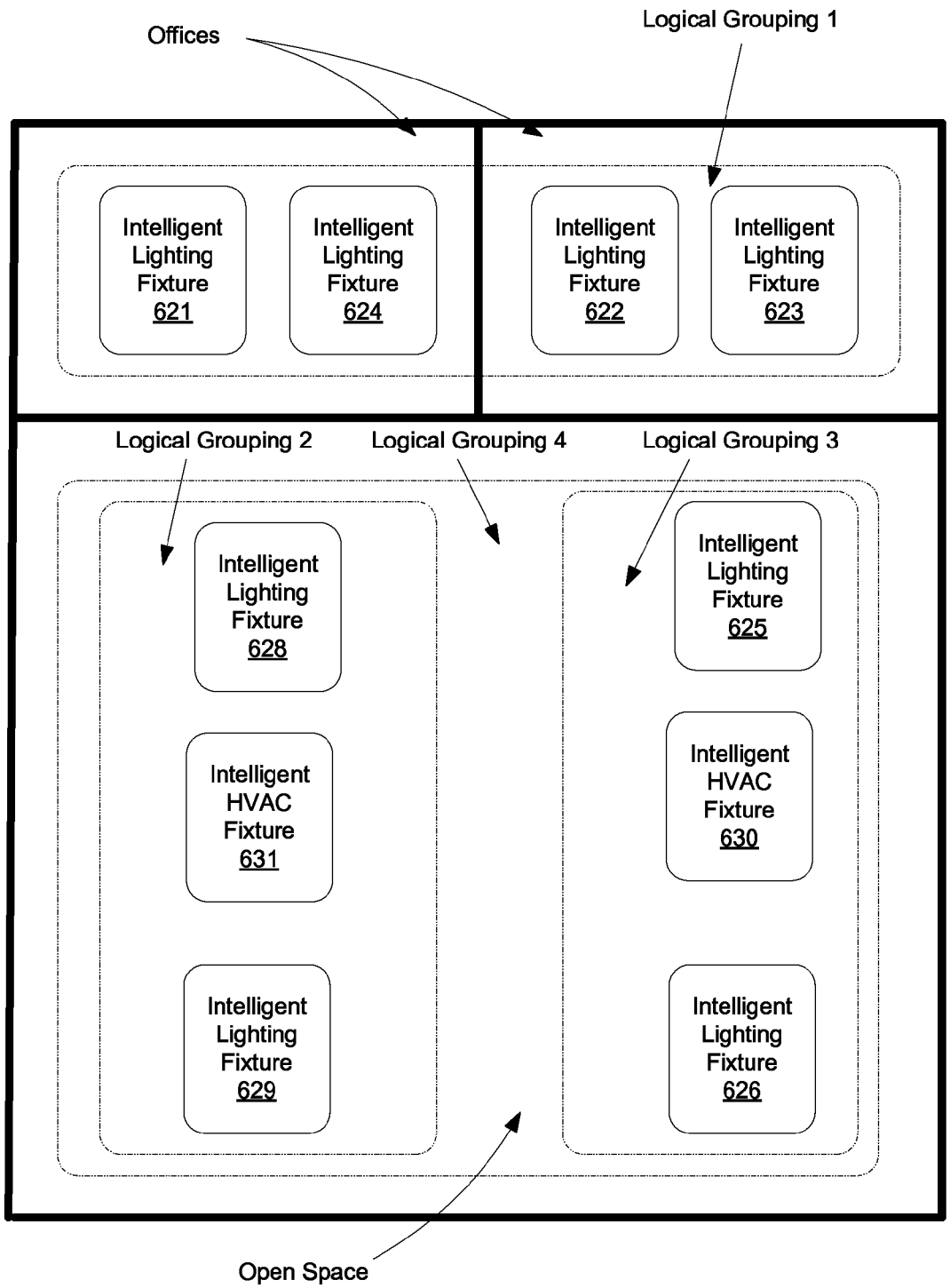
FIG. 6 shows logical groups of loads, according to another embodiment.

FIG. 6 shows logical groups of loads, according to another embodiment. Here, a structure such as a building is shown that includes an office area and an open area. As shown, a first logical grouping (logical grouping 1) includes the intelligent lighting fixtures 621, 622, 623, 624 that are located within the offices. The first logical grouping can control the light, as well as HVAC devices located within the offices. A second logical group (logical grouping 2) includes intelligent lighting fixtures 628, 629 of the open area, and the third logical group (logical grouping 3) includes the intelligent lighting fixtures 625, 626 of the open area. A fourth logical group (logical grouping 4) includes intelligent HVAC fixtures 630, 631 of the open area. Each of the logical groupings can be controlled to reduce a power load of each logical group based upon the sensitivity coefficient and the baseline load of the logical group. Further, at least one load of at least one of the logical group sensing a parameter, wherein a power load of the at least one load is based on the sensitivity coefficient and baseline load of the at least one logical group, and further based on the sensed parameter.

At least some embodiments of the loads include fixtures, such as, lighting fixtures, while for other embodiments the loads include environmental control apparatuses, such as, heating, ventilation and air conditioning (HVAC) devices, and other embodiments include security controls. Embodiments of the building fixtures (loads) provide independent, intelligent building controls. The intelligence of each individual building fixture can be enhanced through communication with other building fixtures (loads) of logical groupings of the building fixtures (loads). The logical groupings can be designated in one or more ways, and each building fixture of a logical group can utilizing sensed information from one or more of the other building fixtures (loads) of the logical group. These embodiments allowing for easy, efficient scaling of building control.

At least some of the described embodiments provide building control systems that operate with distributed intelligence. The described embodiments can be utilized to move intelligence from a central point or controller to the building fixtures (loads) themselves.

Embodiments of the building fixtures (loads) include devices that are attached to the walls or ceilings of a structure and are used to provide environmental services such as heat or light, or security services such as surveillance or fire protection. Embodiments of the building fixtures (loads) can be installed by construction crews in new or remodeled buildings, but can be added as necessary later. The most common fixtures (loads) include light fixtures, heating or cooling vents, fans, security cameras, or fire alarms and sensors.

The advent of low-cost microprocessor controllers has allowed the control point to be replicated into each fixture along with communications between controllers, so that centralized control points are no longer needed. The fixtures are now able to operate separately, or in logical groups to control the environment. User control points can be provided as required to allow a user to control one or more logical groupings of fixtures. User control points simply communicate with the network of fixtures to provide the necessary control information. Also system administrators can manage the building functions by setting up or changing logical groupings of fixtures as required to enable proper system operation. Finally, the networks of the describe embodiments provide built-in redundancy, as failed sensors or fixtures can be neutralized and alarmed to keep the fixture network functioning properly.

Figure 7:
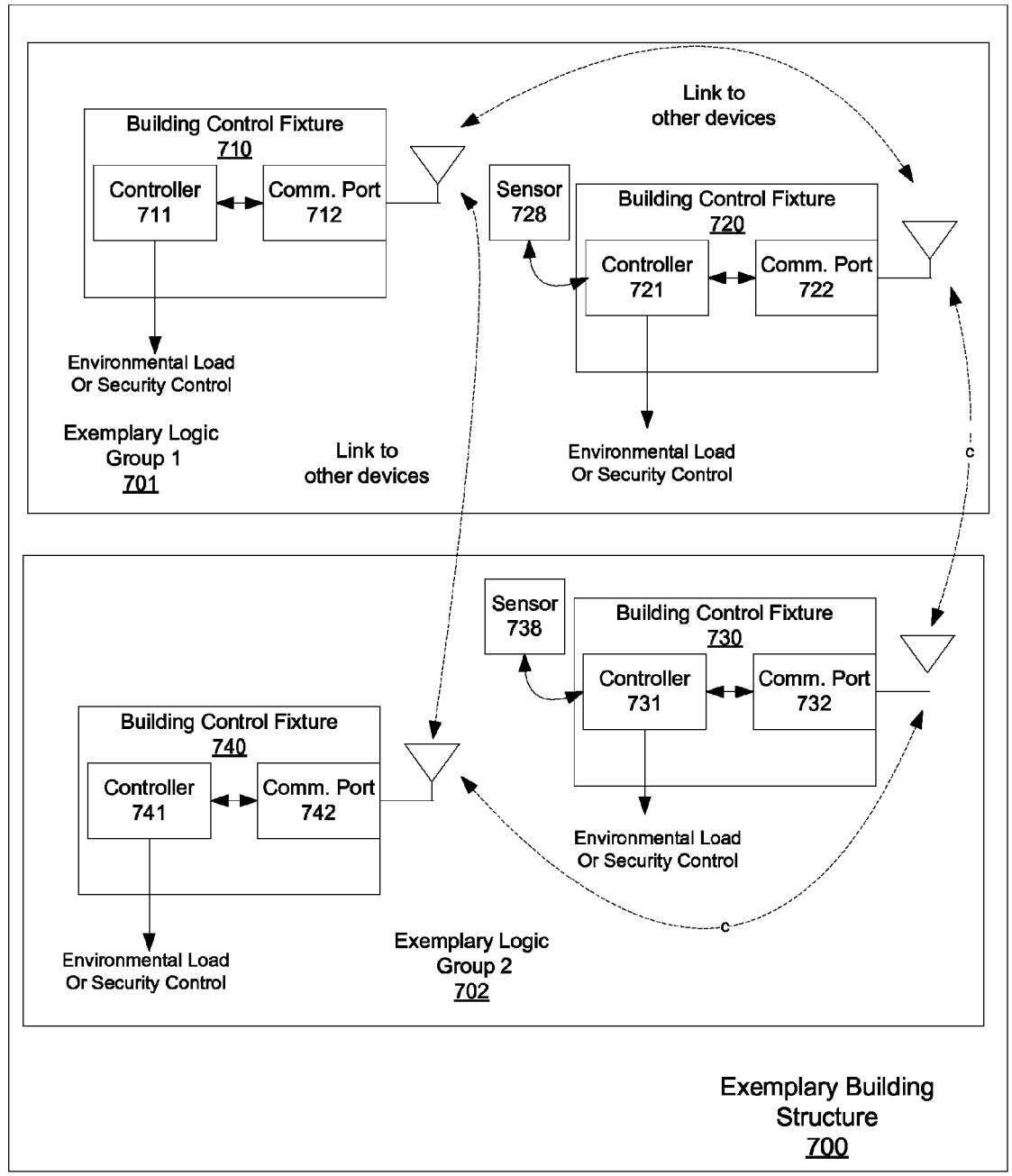
FIG. 7 shows an example of a building control system according to an embodiment.

FIG. 7 shows an example of a building control system according to an embodiment. As shown, the building control system includes a plurality of building fixtures (loads) 710, 720, 730, 740 located within, for example, a building structure 700. It is to be understood that the term "building" may be used here to designate of define any structure that may include and benefit from the use of the described building fixtures (loads), such as, any type of indoor room or structure, including, for example, a parking structure.

The building control system includes at least one sensor (such as, sensors 728, 738) interfaced with at least one of the plurality of building fixtures (loads) (such as, building fixtures (loads) 720, 730). As shown, the building fixtures (loads) 710, 720, 730, 740 each include a communication port (such as communication ports 712, 722, 732, 742) and a controller (such as, controllers 711, 721, 731, 741).

As will be described, each controller is configured to independently control at least one of an environmental load or a security device. Each controller is configured to either receive or help designate the building fixture as belonging to a logical group of building fixtures (loads). Additionally, each controller is configured to share at least one of sensor or state information with other building fixtures (loads) within the logical group of building fixtures (loads), through the communication port.

FIG. 7 shows exemplary logical groups 701, 702. While the logical groupings of FIG. 7 do not overlap (that is, there is not a building fixture shown as belonging to multiple logical groups), embodiments includes building fixtures (loads) belonging to one or more logical groups. As will be described, the logical groups can be dynamic and change over time.

At least some embodiments of the building fixtures (loads) (loads) (also referred to as building control apparatuses) include a device mounted to a wall or a ceiling of a building. Embodiments of the building fixtures (loads) supply a variety of services including light, heat, and cold air as needed. Additionally, or alternatively, multiple of the building fixtures (loads) of a logical grouping of building fixtures (loads) contain sensors or cameras that are used to provide security and fire control systems throughout, for example, buildings.

One embodiment of a building fixture includes an intelligent light fixture. Light fixtures come in many forms with the fluorescent fixture being the most common in buildings. New fluorescent fixtures can be fitted with special ballasts that allow for dimming.

Another embodiment of a building fixture system includes arrays of ceiling fans such as are often found in buildings where the climate is warm or humid. The speed of the fans where people are present can be made faster. HVAC (heating, ventilation, and air conditioning) systems often have multiple ports in a large room. By controlling the flow or temperature of air in active areas cooling and heating costs can be reduced.

Another embodiment of a building fixture system includes an audio speaker array. By varying sound levels to match activity, audio systems can be made more effective.

Another embodiment of a building fixture system includes surveillance systems. An array of surveillance components such as microphones or cameras lend themselves to intelligent control. Activity can be monitored by the system so the fixtures can focus on areas where people happen to be located.

Another embodiment of a building fixture system includes RFID (radio frequency identification) tag reader arrays. Embodiments of RFID tag systems include badge readers lend themselves to intelligent arrays. It is possible to track and display movements of workers in a building by individual. A system of this nature can make access available to certain people while blocking others. By combining the other surveillance components above with RFID tags, any activity of any individual can be monitored in detail.

Another embodiment of a building fixture system includes a fire alarm system. That is, embodiments of the building fixture system can be used for fire alarm systems. The fixtures can sense and monitor possible fire indicators: carbon monoxide, temperature, smoke, sprinkler status, etc. The system can also check for people in a fire area, fire doors, etc. Activation of a fire alarm box can place the array into a fire mode to track or confirm the alarm in order to lock down elevators, close fire doors, and notify security. Today's fire alarm systems can be expensive to install and maintain. Using an array of intelligent building fixtures (loads) can greatly reduce installation and maintenance costs as it can be piggybacked onto an existing array.

Embodiment includes various methods of deploying the described intelligent building fixtures (loads). Generally, four modes of deployment have been identified.

A first mode includes an installation mode. Fixtures are normally be installed by electricians. As each fixture is installed, it may be tested by powering it up. In the installation mode, each fixture responds independently with the fixture turning on or providing an audible or visual indicator when powered up.

A second mode includes a setup mode. Once the installation is finished the array of fixtures enters the setup mode. Two types of setup are possible. A first setup type is automatic. In this mode, the fixtures would learn to communicate with each other. The first step would be for each fixture to identify itself to the other fixtures in the array. The fixtures would be interconnected via a data network. Each fixture would perform a function visible to the adjacent fixtures. In this manner, it is possible to associate the address of a fixture with its physical location. Obstructions such walls would form the boundaries of each array. A typical array would include a single line 1×N (hall), or an M×N array (room). Other geometric shapes are a circle, a ring, a trapezoid, or a triangle. Stairs between floors would be also identified. Once an array of fixtures is recognized, it can later be tagged and associated with a control device, such as a switch, by a system administrator. A second setup type is manual. Manual identification of an array of fixtures would be performed by a system administrator. First, the administrator would identify a fixture using a laser pointer. The administrator would then add each fixture to an array. When the process is performed manually, the administrator would have complete control of the setup process. The administrator would identify the array and assign a switch to control it. When the administrator has finished the setup of the fixtures, he would allow the system to progress to the operational mode.

A third mode includes an operational mode. Fixtures perform as a unit in the operational mode. The arrays previously set up respond to activity or controls such as switches. In the operational mode, the fixtures execute software that has been previously selected by the administrator or downloaded from an external source. This software allows the fixtures to track movement by a person walking along a hall or through a room. Based on the movement, the fixtures tracks or illuminate the party as the party moves through the space. The operational mode also provides for simple additions or replacement of fixtures. Major changes can require the system to enter a teardown mode.

A fourth mode includes a teardown mode. The teardown mode is used when major troubleshooting, repair or changes of the array are needed. The teardown mode restores the system to the installation mode. In that mode, the array can be modified and made ready for setup.

Embodiments of the building control systems include building fixtures (loads) that are networked. In order for the fixtures to communicate they would be part of a data network. The network can be a typical wired or wireless LAN. The network can also be a specialized network such as a wireless Ad-Hoc network, or a Bluetooth network. Another type of network is a data network that communicates over the power lines. This type of network saves having to run special data wiring to each fixture. Each fixture would be assigned a MAC layer address when manufactured which would be used during setup and operation to identify the fixture.

Referring back to FIG. 7, at least one of the building control fixtures (720, 730) is interfaced with a sensor 728, 738. However, another embodiment includes the sensor being physically incorporated into at least one of the building fixtures (loads). Various configurations of the sensor include a light sensor, a motion sensor, or an environment sensor (such as a temperature sensor or humidity sensor). It is to be understood that each sensor can include one of such listed sensors, or any combination of the listed sensors. Other possible types of sensors include, for example, a sound/noise sensor, an intrusion detection sensor, a seismic motion (or structural motion detection) and/or a voltage/current/power meter.

For at least some embodiments of the building control system of FIG. 7, the building control fixtures 710, 720, 730, 740 are independently operable. That is, each of the fixtures can operate completely independently, and the controller within each fixture is operable without receiving any commands from a central controller. For other embodiments, the fixtures operate in conjunction with other fixtures, such as, other fixtures within a common logical group. For this embodiment, decisions regarding building control can involve a collaborative interaction between multiple fixtures. For other embodiments, one or more fixtures are interfaced with a system controller.

For an embodiment, each controller 711, 721, 731, 741 independently control an environmental load or a security device. More specifically, the controller controls at least one of a lighting intensity, an environmental control, or a building security control. As will be described, the building control fixtures can include lighting (that is, a light in included with the fixture), and the controller of the fixture controls the intensity of light emitted from the light. Alternatively or additionally, the fixture can include environment control, such as, temperature or humidity. For this embodiment, the fixture can be interface or be a part of an HVAC system. Alternatively or additionally, the fixture can interface with or be a part of a building security system.

For at least some embodiments, the controller of each fixture is operative to independently control the environmental load and/or the security device based on at least one of shared sensor or shared state information received from at least one other of the plurality of building fixtures (loads) within the logical group. For embodiments, the environmental control includes light, temperature and/or humidity. For embodiments, the shared sensor information includes sense light, motion, temperature, humidity, and other possible sensors. For embodiments, the state information includes, for example, occupancy information, clear state timer, light fixture emitted light intensity.

A fixture may control, for example, an intensity of light emitted from the fixture based at least in part on a sensed parameter from another fixture of the logical group. A fixture may control heat or humidity based on temperature or humidity sensing of other fixtures within the logical group. A fixture may make security decisions based on parameters sensed by other fixtures of the logical group.

A factor that greatly adds to the intelligence of the distributed building control fixtures are the designations of logical groups, wherein building fixtures (loads) of a logical group control building parameters based on sensed input from other building control fixtures of the logical group.

For an embodiment, the controller within a building control fixture is operative to help designate one or more of the plurality of building fixtures (loads) as belonging to the logical group. That is, the fixtures operate in conjunction with other fixtures, such as, other fixtures within a common logical group. For this embodiment, decisions regarding building control can involve a collaborative interaction between multiple fixtures.

For another embodiment, at least a sub-plurality of the plurality of building fixtures (loads) auto-determine which building fixtures (loads) are included within the logical group.

For an embodiment, fixtures auto-designate logical groups based on location and/or proximity. That is, for one example, each fixture knows their location (for example, x, y and z coordinates) and auto-designates based on a sensed input, and proximity, or a location (for example, x, y and z coordinates) of the sensor that generated the sensed input. Fixtures which are classified into certain categories (e.g. corridor, emergency) affiliate themselves with other fixtures based on commonality of category and proximity. For example, a fixture in a corridor or emergency path will receive motion sensing input from another fixture in the corridor or emergency path and, based on the fact that they are both in the same category and that they are within a distance threshold (proximity) determines that it is in the same motion group as the fixture from which input (sensed) was received.

State another way, for an embodiment, auto-determining includes at least one of the building fixtures (loads) receiving a sensed input of a different building fixture, and the at least one building fixture auto-designating itself into a logical group that includes the different building fixture based on a proximity of the at least one building fixture to the different building fixture. For a specific embodiment, the at least one building fixture determines its proximity to the different building fixture based on a three-dimensional x, y, z location of the at least one building fixture relative to a three-dimensional x, y, z location of the different building fixture.

While described in the context of auto-designating groups, it is to be understood that location or proximity information can be used by fixtures to influence operation. That is, for example, a fixture may base its operation based on logical groupings, and additionally, based on the proximity of a sensed input.

For an embodiment, an administrator specifies which of the plurality of building fixtures (loads) belong to the logical group. Generally, the administrator specification occurs at installation, and may remain static. For another embodiment, a manual operator specifies which of the plurality of building fixtures (loads) belong to the logical group. This can include the operator having a manual control (such as a switch or a set of switches) that allows the manual operator to set and control logical groupings.

An embodiment includes each of the building fixtures (loads) of the logical group additionally being operative to receive an input from a device, wherein the building fixture responds to the input if the input includes an identifier associating the input with the logical group. For this embodiment an external controller can interface with particular logical groups based on the unique identifier associated with the logical group. Associating the unique identifiers with logical groups provides for ease of scaling of the number of building fixtures (loads). That is, for example, conventional centrally-controlled systems require either more messages or larger messages to control building fixtures (loads), whereas including unique identifiers with logical groups provides for an efficient system in which the transmitted data doesn't grow or increase as the group grows. Additionally, the system is less reliant on and requires less use of any one communication channel, and therefore, the likelihood of failure due to communication channel use is less.

An embodiment includes building fixtures (loads) within the logical group restarting a clear-state-timer upon sensing of motion and/or light by a building fixture within the logical group. The clear-state time can be defined by an occupancy window that estimates, for example, how long a space will be occupied after sensing an occupant. That is, for example, lights can be turned on within a building or structure for a period of the clear-state-timer, which can be estimated by an occupancy window. This embodiment allows members (building fixtures (loads)) of a logical group to transition states while maintaining synchronization with each other.

An exemplary method or sequence of events of a clear-state-timer operation includes fixture in motion group detecting motion. For operation of an exemplary set of lighting fixtures, all fixtures in motion group brighten and set an occupancy window of some configured time. At the expiration of the occupancy window, the fixtures should dim/turn off. However, if during the occupancy window, some fixtures in the motion group subsequently detects motion, all fixtures in the motion group reset the occupancy window since the area covered by the motion group is still occupied. After the occupancy window expires, all fixtures dim or turn off.

For an embodiment, sensing of motion and/or light by building fixtures (loads) within the logical group within a predetermined amount of time after restarting a lighting on-time are ignored. That is, for example, sensing of light and/or motion is ignored just after lighting of the lighting fixtures. The period of time in which sensed inputs are ignored can be defined a dead-time. The dead time can reduce "chatter" between lights of a logical group. That is, multiple lights within a logical group can near-simultaneously sense a change in motion and/or light which can cause redundant or excess chatter among the lighting fixtures of the logical group.

An embodiment includes a building fixture ignores its own sensing of light and/or motion for a predetermined period of time if the building fixture receives an indication of sensing of light and/or motion from another fixture of the logical group. This process can be defined as "anti-sensing". Anti-sensing can be useful, for example, for preventing a light fixture of an office or a conference room from turning on when someone passes by outside the office or conference room.

Figure 8:
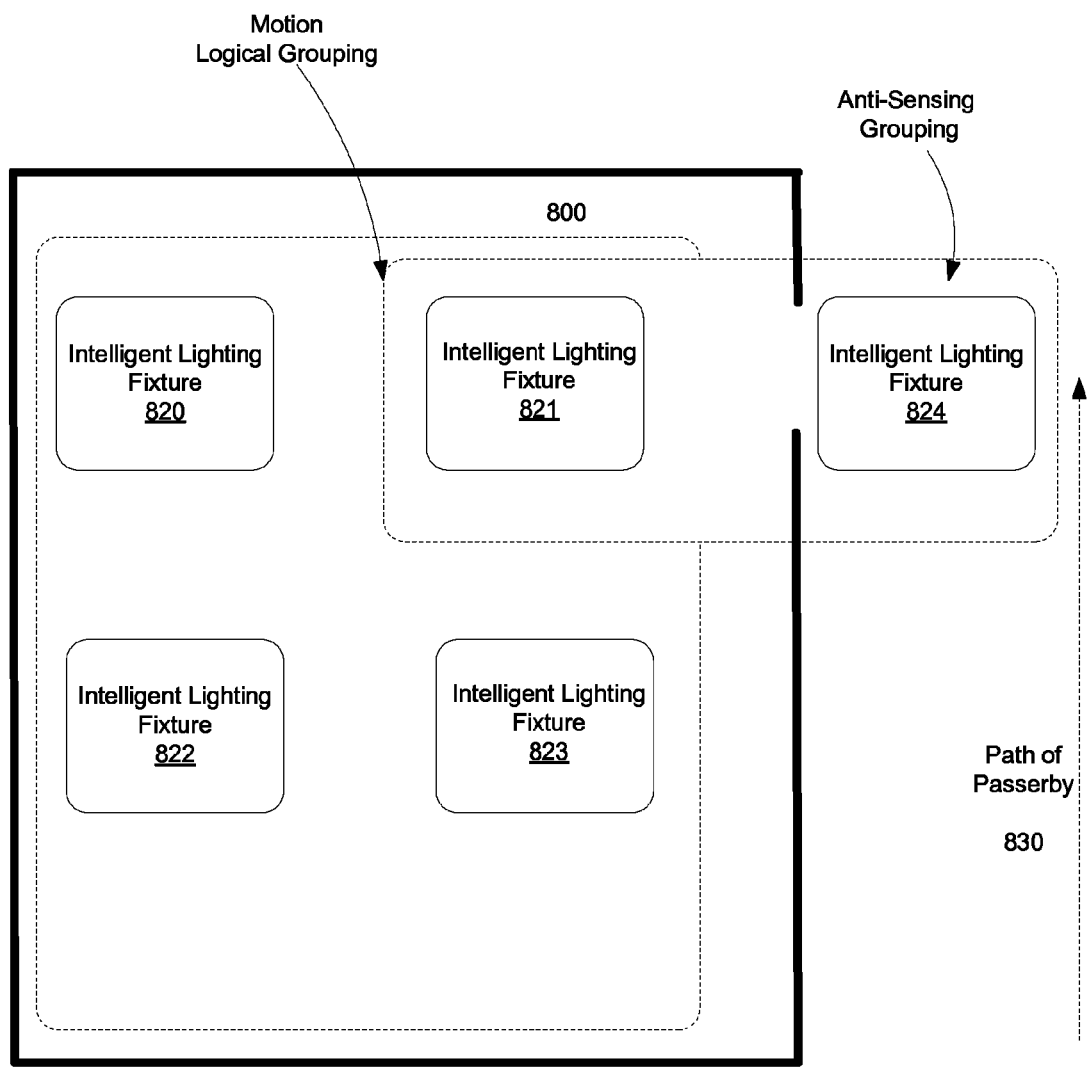
FIG. 8 shows an example of an anti-sensing group of fixtures.

FIG. 8 shows an example of an anti-sensing group of fixtures. An motion sensing group includes fixtures 820, 821, 822, 823. Also as shown, an anti-sensing group is formed that includes the fixture 821 which is location within, for example, a conference room 800, and a second fixture 824 is located outside of the conference room. For this embodiment, if both fixtures 821, 824 in the anti-sensing group detect motion, the fixture 821 in the conference room will ignore its own sensing of motion (anti-sensing) as will the other fixtures 820, 822, 823 within the motion sensing group because the detection of motion by the fixture 824 outside the room indicates that a passerby 830 triggered this motion event.

Various embodiments include different types of logical groups. Exemplary logical group types include, for example, a motion sensing group (previously mentioned), an ambient light group, a logical temperature group, and a logical switch group. Clearly, additional types of logical groups can additionally or alternatively exist. Additionally, a building fixture can belong to any number of different logical groups. Logically grouping of building fixtures (loads) is useful for synchronizing members of logical groups, normalizing behavior based on larger samples of data, and/or making better decision based on larger sample of data. Additionally, a fixture being able to belong to any number of different groups is difficult and expensive in centrally controlled systems. As the membership list of fixtures in a centrally controlled system grows, the data that the controller must manage grows, which causes scaling problems.

An exemplary motion sensing group can be utilized, for example, by lighting fixtures located in a corridor. For an embodiment, building fixtures (loads) of a corridor determining they are in a corridor, and auto-designate themselves to be included within a common logical group (that is, the motion sensing group). Further, the motion sensing group includes a corridor look-ahead behavior, wherein for the look-ahead behavior, a plurality of overlapping logical groups of building fixtures (loads) provide propagation of light along a corridor.

This propagation of light can be used in applications where objects are moving at a high speed and the path of the object's motion needs to be illuminated. Additionally, the corridor look-ahead behavior provides for a safer environment in sparsely populated hallways during the night since individuals moving through the corridor can see farther ahead. By using the corridor look-ahead behavior, the motion sensing group can achieve an effective mix of safety and energy efficiency because the appropriate level of light is provided without having to illuminate the entire corridor (as is the case with many traditional lighting control systems).

For the ambient light group, an embodiment includes at least a subset of the plurality building fixtures (loads) auto-designating themselves to be within the ambient light group. The auto or self-designation of the light can be made, for example, by the at least a subset of the plurality of light determining that they receive a change of light near-simultaneously (that is, for example, within a defined time slot).

For an embodiment, if at least one of the building fixtures (loads) of the logical group sense a motion and/or light sensing blindness condition, then the at least one building fixture retrieving sensing information from other building fixtures (loads) within a common logical group to determine motion and/or ambient light level, and the building fixture responds accordingly. That is, a building fixture (such as a lighting fixture) solicits information from others in logical group if the lighting fixture is blind. It is to be understood that the same concept can be extended to other sensor as well, such as, motion sensors or temperature sensors.

For a logical switching group, an embodiment includes the logical group being designated by a group id, and building fixtures (loads) that are members of the logical group having the group id are controlled by a logical switch or a physical switch. For an embodiment, the member building fixtures (loads) are controlled to provide predetermined scenes.

For example, a conference room might have predetermined scenes which dim the fixtures near a projector screen or group viewing monitor. Other scenes can include optimizing light levels for specific tasks (for example, task tuning).

An embodiment includes at least one building fixture of the logical group receiving a reference or baseline value for at least one of motion and/or light sensor input from another building fixture in the logical group. For example, a lighting fixture solicits the ambient light level from another lighting fixture in the logical group to establish a reference for the minimum light level in a particular building location. Further, the lighting fixture may receive the input from the other fixture(s) in the group, and then compare its own measured (sensed) values against the received values to make a decision. For example, the received values could be a target (such as a heating or cooling target, and further the fixture adjusting its temperature until it reaches the target). For another embodiment, the building fixture uses the received value to determine some external factor. For example, the value received from a fixture located outside can be used to determine outside temperature which can be used to aid in adjustment of an inside temperature. Clearly, these embodiments can be extended beyond just temperature control.

For the logical temperature group, an embodiment includes a building fixture receiving at least one of an occupancy (motion) input and a temperature sensor input from at least one of the other fixtures in the logical group to control an environmental load. For other embodiments, this can further include the building fixture controlling the environmental load by averaging the temperatures of all the building fixtures (loads) in the logical group. Additionally or alternatively, embodiments include the building fixture controlling the environmental load, for example, using only the temperatures of building fixtures (loads) in the logical group which are reporting occupancy. For embodiments, the environment is controlled only in places that matter, such as, occupied spaces. The described embodiments allow from determination of whether a space is really occupied, are whether one is merely passing through the spaces.

FIG. 9 is a flow chart that includes steps of an example of a method of operating a building control fixture according to an embodiment. A first step 910 includes designating the building fixture as belonging to a logical group of building fixtures (loads), wherein the designating comprises at least one of receiving the designation or the building fixture aiding in the designation. A second step 920 includes independently controlling, by the building control fixture, at least one of an environmental load or a security device. A third step 930 includes sharing, by the building control fixture, at least one of sensor or state information with other building fixtures (loads) within the logical group of building fixtures (loads), through a communication port of the building control fixture.

As previously described, and embodiment further comprising the building control fixture receiving a sensor input, wherein the sensor input includes at least one of light, motion, or an environmental condition.

Figure 10:
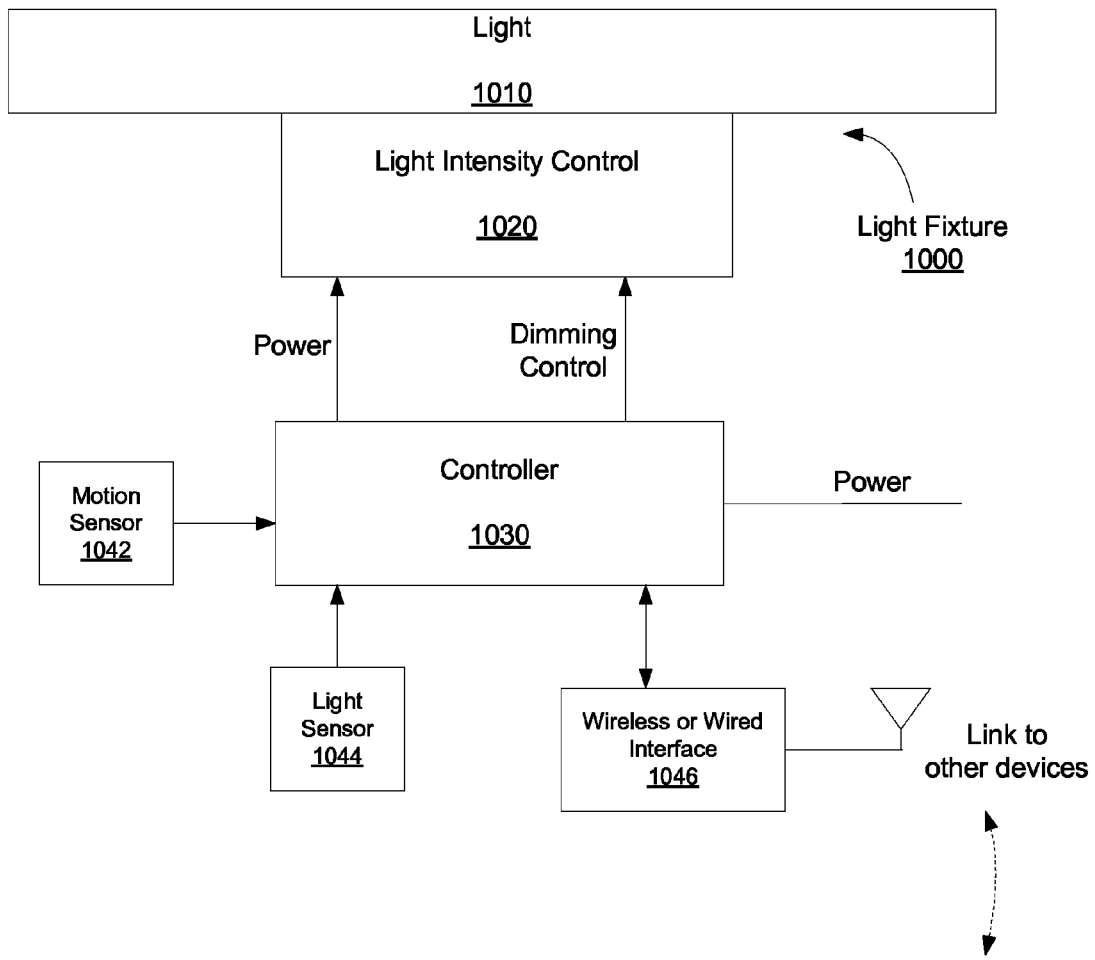
FIG. 10 shows a building fixture that provides lighting control according to an embodiment.

FIG. 10 shows an example of an intelligent lighting fixture 1000. A controller 1030 provides dimming and/or power control to a light 1010 through a light intensity control (such as, a dimming ballast) 1020. For an embodiment, the light intensity control 1020 receives a power input and a dimming control input, and provides a regulated current to the light 1010.

The intelligent light controller 1030 communicates with other devices through a wireless or wired interface 1046. The other devices include, for example, an authorized (manager) device, one or more other intelligent lighting fixtures.

As a part of, for example, an energy-savings mode of the intelligent light controller 1030, the intelligent light controller 1030 receives inputs from sensors, such as, a motion sensor 1042 and/or a light sensor 1044. Clearly, other sensors can be utilized as well.

For at least some embodiments, the light 1010 is a gas-discharge lamp, which is typically a negative-resistance device. Such devices cannot effectively regulate their current use. If such a device were connected to a constant-voltage power supply, it would draw an increasing amount of current until it was destroyed or caused the power supply to fail. To prevent this situation, a ballast (such as the dimming ballast 1020) provides a positive resistance that limits the ultimate current to an appropriate level. In this way, the ballast provides for the proper operation of the negative-resistance device by appearing to be a legitimate, stable resistance in the circuit.

Figure 11:
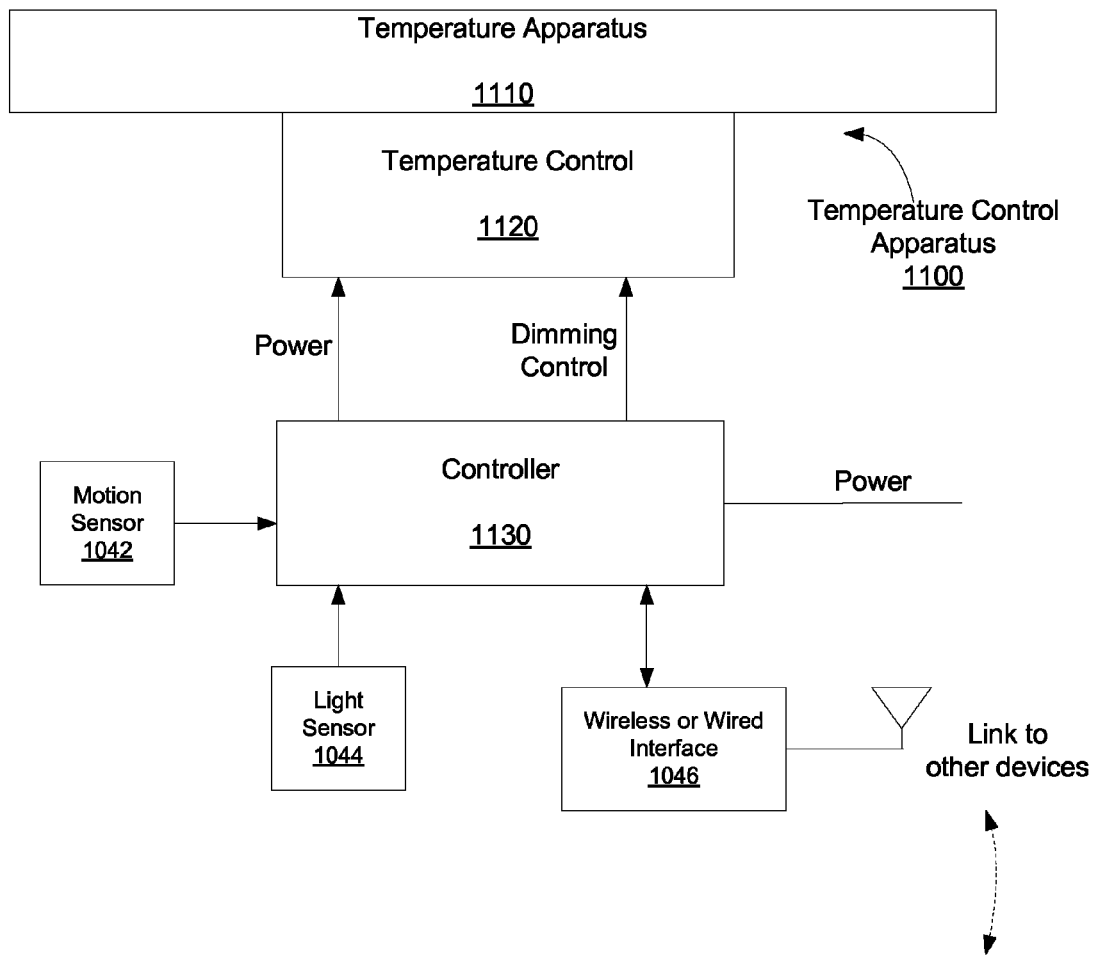
FIG. 11 shows a building fixture that provides environmental control according to an embodiment.

FIG. 11 shows an example of an intelligent temperature control apparatus 1100. The temperature control apparatus can be, for example, at least a part of a HVAC system. A controller 1130 provides temperature control to a temperature apparatus 1110 through, for example, a temperature controller 1120. This embodiment includes similar sensors 1042, 1044 and communication interface 1046.

FIG. 11 exemplifies that the logical grouping control for lighting of the described embodiments can be extended to, for example, temperature control. That is, sensing conditions, such as, temperature, motion and/or light of one temperature control apparatus can be used to aid in the control of another temperature control apparatus.

Figure 12:
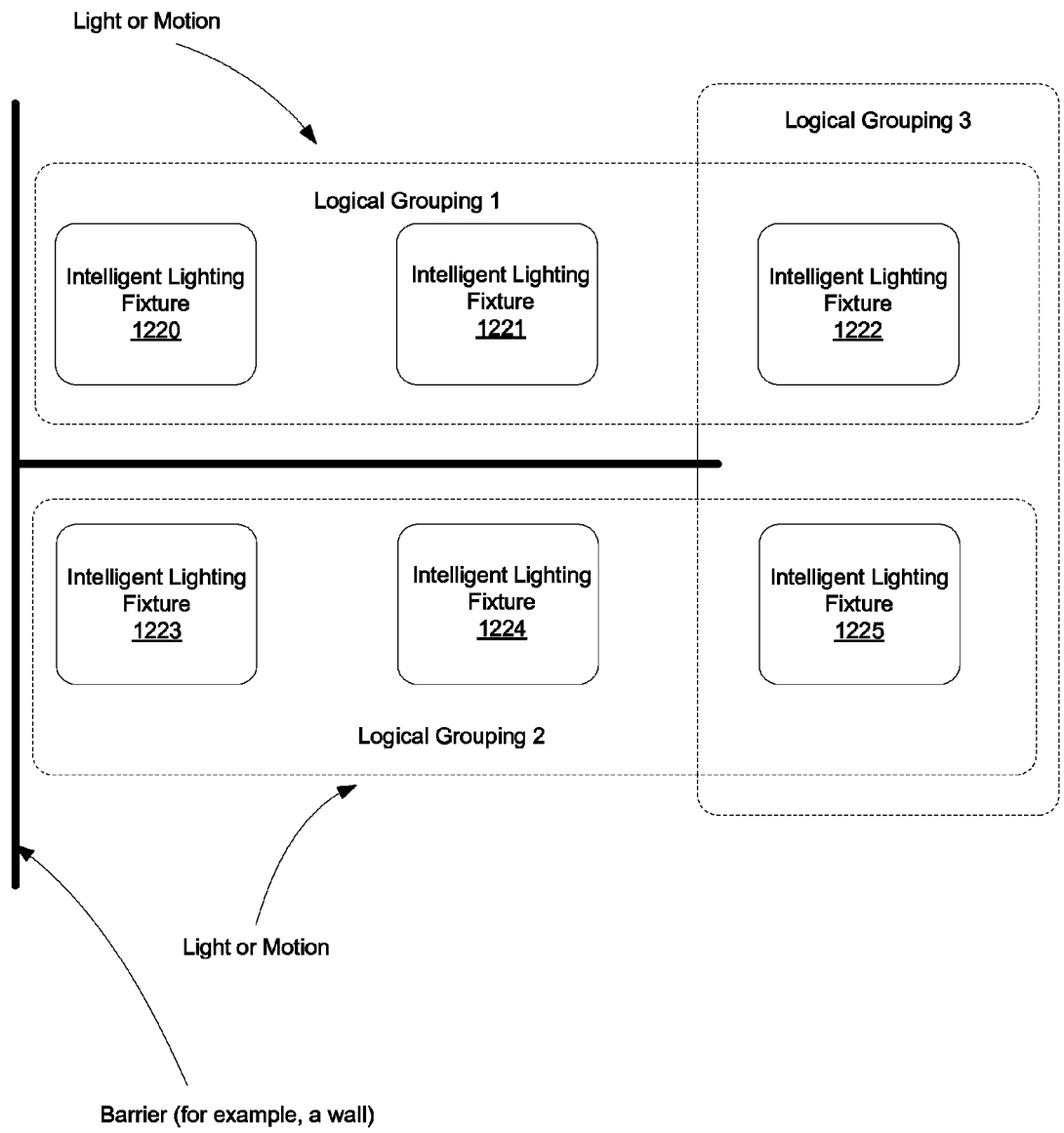
FIG. 12 shows an example of a lighting system that includes logical groupings of intelligent lighting fixtures.

FIG. 12 shows an example of a lighting system that includes logical groupings of intelligent lighting fixtures. For example, a first logical group (grouping 1) includes intelligent lighting fixtures 1220, 1221, 1222, and a second logical group (grouping 2) includes intelligent lighting fixtures 1223, 1224, 1225, and a third logical group (grouping 3) includes intelligent lighting fixtures 1222, 1225.

Different embodiments include the logical groupings being made in different ways. For example, the logical groupings can be made by commonality of motion and/or light sensing of the groups. The logical groupings can be predefined by a lighting system manager.

As shown in FIG. 12, an exemplary barrier, such as, a wall defines the logical groupings. For example, due to the presence of the wall, a natural logical group 1 and logical group 2 can result. That is, light or motion sensed by the members of the logical group 1 may not be sensed or be relevant to the members of the logical group 2. Additionally, a third logical group 3 may have commonality in sensing within themselves, but be different than those of logical groups 1 and 2.

For at least some embodiments, each of the intelligent light fixtures operate independently, but can receive additional information from sensors of other intelligent light fixtures within a common logical group. As shown in FIG. 12, intelligent lighting fixtures can belong to multiple logical groups. The logical groupings can be dynamic and defined in multiple ways.

A system operator can predefine logical groups, and the system operator can later change the logical groupings. Additionally, as previously described the intelligent lighting fixtures can define logical groupings themselves.

Figure 13:
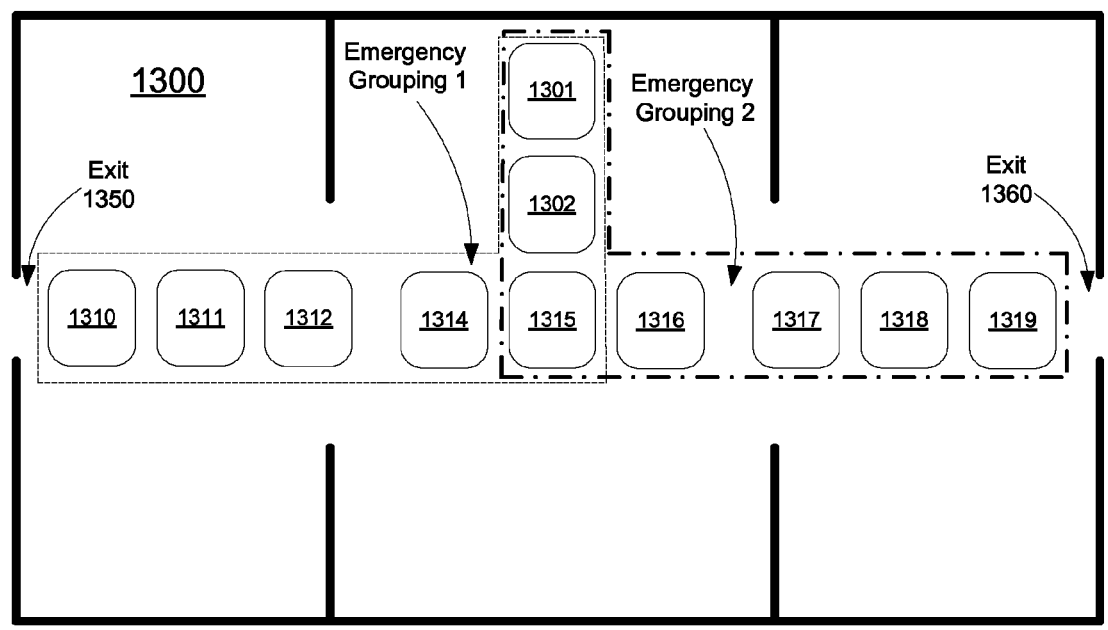
FIG. 13 shows an example of emergency path groups of fixtures.

FIG. 13 shows an example of emergency path groups of fixtures. The emergency path logical groups can be designated by any of the described methods. Once designated, the logical groupings can work individually or in combination to provide at least one indicator of a safe path for occupants of a building structure 1300. A first emergency logical group includes building fixtures (loads) 1310, 1311, 1312, 1314, 1315, 1302, 1301, while a second emergency logical grouping includes fixtures 1301, 1302, 1315, 1316, 1317, 1318, 1319. If an emergency indicator is received by one or more of the building fixtures (loads), the building fixtures (loads) or corresponding emergency logical groups can respond. For example, lights of the emergency logical groups can flash or provide some sort of an alert to occupants of the building structure 1300 that an emergency condition exists. The emergency condition can come from anywhere (such as an internal or external sensor), and indicate any type of emergency (such as, fire, flood, smoke, earthquake, ect.). Once the emergency indicator has been received, emergency logical groups can additionally used sensors of other fixtures to deduces and determine, for example, safe exist paths for occupants. For example, if the building fixture 1319 senses heat or smoke in the vicinity of the building fixture 1319, either one or both of the emergency logical groups (1 or 2) can provide one or more indicators (such as arrows are other indicators of direction) that provide a safe path for occupants to, for example, exit 1350, or away from exit 1360. For example, the indicators can provide a safe path away from the building fixture 1319 (near exit 1360) in which smoke or heat has been sensed.

State in another way, for an embodiment, the logical groups comprise emergency path groups, and the emergency path groups respond to reception of an emergency indicator, and further respond to sensed conditions of one or more sensors of other fixtures. Further, for an embodiment, the emergency path group provides a safe path indicator for directing occupants to a safe path when the emergency indicator is received.

Figure 14:
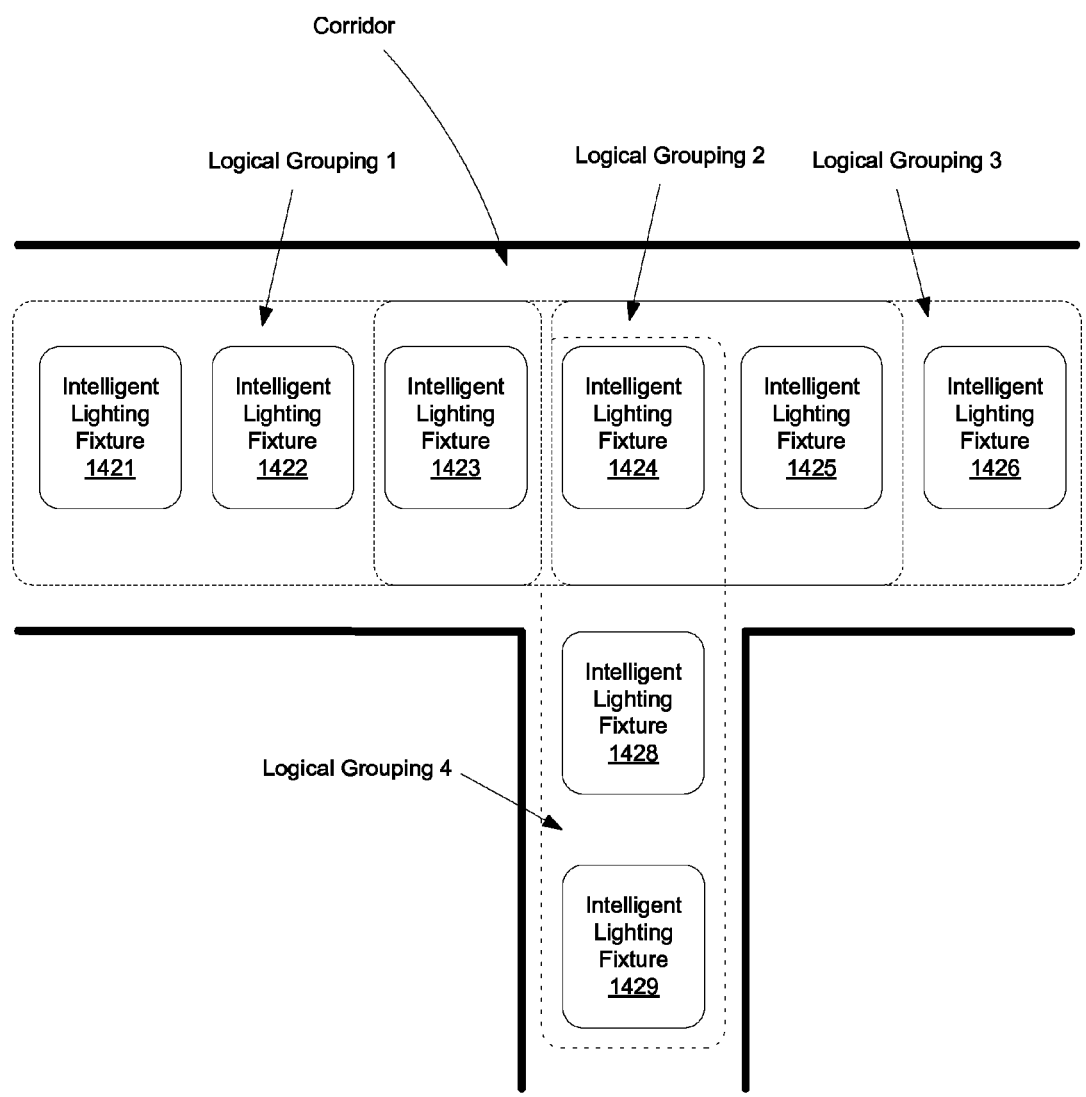
FIG. 14 shows an example of logical groupings of intelligent lighting fixtures within a corridor.

FIG. 14 shows an example of logical groupings of intelligent lighting fixtures within a corridor. As shown, a first logical grouping of intelligent lighting controllers can include intelligent lighting fixtures 1421, 1422, 1423, a second grouping of intelligent lighting controllers can include intelligent lighting fixtures 1423, 1424, 1425, a third grouping of intelligent lighting controllers can include intelligent lighting fixtures 1424, 1425, 1426, and a fourth group of intelligent lighting controllers can include intelligent lighting fixtures 1424, 1428, 1429.

As a user travels down the corridor, the intelligent lighting fixtures can each forecast the arrival of the user by utilizing information from other intelligent lighting fixtures within the same logical grouping. For example, intelligent lighting fixture 1423 can be alerted that a user is nearby and likely to be traveling near the intelligent lighting fixture 1423 through motion sensors of the intelligent lighting fixture 1421, which is in the same logical group as the lighting fixture 1423. Similarly, intelligent lighting fixture 1424 can be alerted that a user is nearby and likely to be traveling near the intelligent lighting fixture 1424 through motion sensors of the intelligent lighting fixture 1429, which is in the same logical group as the lighting fixture 1424. The control of each individual intelligent lighting fixture is made more intelligent by providing the intelligent lighting fixture with information of sensors of other intelligent lighting controllers of common logical groups.

FIG. 15 is a flow chart that includes the steps of a method of distributed lighting control according to an embodiment. A first step 1510 includes each of a plurality of independently controlled lighting fixtures sensing light and/or motion, and independently controlling an intensity of light of the lighting fixture. A second step 1520 includes specifying one or more of the plurality of independently controlled lighting fixtures as belonging to a logical group. A third step 1530 includes each of the lighting fixtures of the logical group additionally controlling the intensity of light of a lighting fixture based on sensing of light and/or motion of another lighting fixture of the logical group.

For at least some embodiments, at least one of the plurality of independently controlled lighting fixtures belongs to a plurality of logical groups. Further, at least some embodiments include a central system administrator that specifies which lighting fixtures belong to the logical group, while other embodiments include a manual operator that specifies which lighting fixtures belong to the logical group.

For at least some embodiments, at least a sub-plurality of the plurality of independently controlled lighting fixtures auto-determines the logical group. For example, a single switch can cause the sub-plurality of lighting fixtures to reboot. The sub-plurality of lights can detect the near-simultaneous rebooting of the sub-plurality of lights and, therefore, self or auto designate themselves as belonging to the logical group.

For at least some embodiments, lighting fixtures within the logical group restart an on time for the lighting upon sensing of motion and/or light by a lighting fixture within the logical group. Further, sensing of motion and/or light by lighting fixtures within the logical group within a predetermined amount of time after restarting a lighting on-time are ignored. That is, just after lighting of the lighting fixtures, following sensing of light and/or motion is ignored, defining a deadtime. This can reduces "chatter" between lights of a logical group. That is, multiple lights within a logical group can near-simultaneously sense a change in motion and/or light which can cause redundant or excess chatter among the lighting fixtures of the logical group.

At least some embodiments includes anti-motion, wherein if a lighting fixture receives an indication of sensing of light and/or motion from another lighting fixture, the lighting fixture ignores its own sensing of light and/or motion for a predetermined period of time.

At least some embodiments include deferral, wherein if at least one lighting fixture of a logical group senses light sensing blindness, an excessive false motion condition, or some other suspect sensor input, the lighting fixtures sensing suspect sensor input retrieve sensor input from other lighting fixtures within the logical group and ignore their own input. That is, the lighting fixtures solicit information from others in the logical group if the lighting fixtures' sensors are providing bad input.

For at least some embodiments, the logical group comprises a motion sensing group. For a specific embodiment, lighting fixtures of a corridor determine they are in a corridor, and auto-designate themselves to be included within a logical group. For a specific embodiment, the motion sensing group includes a corridor look-ahead behavior, comprising a plurality of overlapping logical groups of lighting fixtures that provide propagation of light along a corridor.

For at least some embodiments, the logical group includes an ambient light group. For a specific embodiment, at least a subset of the plurality of lights auto-designate themselves to be within a logical group. The auto or self-designation of the light can be made, for example, by the subset of the plurality of lights determining that they receive a change of light near-simultaneously (within a defined time slot). For an embodiment, if at least one of the lighting fixtures of the logical group sense a light sensing blindness condition, the at least one lighting fixture retrieves sensing information from other lighting fixtures within a common logical group to determine an ambient light level, and the lighting fixture responds accordingly. That is, the lighting fixture solicits information from others in logical group if the lighting fixture is blind.

For at least some embodiments, the logical group includes a logical switch group. For a specific embodiment, the logical group is designated by a group id, and lighting fixtures that are members of the logical group having the group id are controlled by at least one of a logical switch and a physical switch, wherein the member light fixtures are controlled to provide predetermined scenes.

FIG. 16 is a flow chart that includes the steps of a method of distributed temperature control according to an embodiment. A first step 1610 includes each of a plurality of independently controlled temperature apparatuses sensing temperature, light, and/or motion, and independently controlling a temperature. A second step 1620 includes specifying one or more of the plurality of independently controlled temperature apparatuses as belonging to a logical group. A third step 1630 includes each of the temperature apparatuses of the logical group additionally controlling temperature based on sensing of temperature, light and/or motion of another temperature apparatus of the logical group.

Although specific embodiments have been described and illustrated, the described embodiments are not to be limited to the specific forms or arrangements of parts so described and illustrated. The embodiments are limited only by the appended claims.

What is claimed:

1. A method of managing a building load reduction of a plurality of loads within a building, comprising:
   assigning one or more loads of the plurality of loads to a logical group of a plurality of logical groups;
   assigning a sensitivity coefficient to each logical group of the plurality of logical groups, wherein the sensitivity coefficient is directly proportional to an impact on occupants in the building to changes in a power load of the logical group;
   determining a baseline load for each of the logical groups;
   receiving a power reduction demand response; and reducing a power load of each logical group based upon the sensitivity coefficient and the baseline load of the logical group; wherein assigning the sensitivity coefficient comprises determining an impact of the power load of the logical group to users who utilize the loads of the logical group, wherein the sensitivity coefficient for each logical group is inversely related to a loss in productivity of an organization for a unit percentage reduction in a lighting load of the logical group.

2. The method of claim 1, further comprising at least one load of at least one of the logical group sensing a parameter, and wherein a power load of the at least one load is based on the sensitivity coefficient and baseline load of the at least one logical group, and further based on the sensed parameter.

3. The method of claim 2, further comprising a plurality of the loads sensing the parameter continuously over time, thereby providing re-distribution of power loads continuously over time.

4. The method of claim 3, further comprising maintaining a power load target reduction over a target period, including continuously adapting to sensed parameter changes redistributed throughout the logical groups and power loads of the logical groups, based on the sensitivity coefficients and baseline loads of the logical groups.

5. The method of claim 1, wherein assigning logical groups comprises identifying a commonality between the one or more loads of the plurality of loads.

6. The method of claim 1, wherein determining a baseline power load for each of the logical groups comprises monitoring a power load of the logical group over a period of time.

7. The method of claim 1, wherein if two logical groups have substantially identical baseline loads, then reducing the load of each logical group proportional to the sensitivity coefficient of the logical group.

8. The method of claim 1, wherein if two logical groups have substantially identical sensitivity coefficients, then reducing the load of each logical group proportional to the baseline power load of the logical group.

9. The method of claim 1, further comprising monitoring a load consumption for each logical group, and increasing or decreasing the load if required to achieve a specified load target.

10. The method of claim 1, further comprising sensing occupancy of areas of each logical group, and further comprising reducing the load to logical groups that do not sense occupancy upon receiving the power reduction demand response.

11. A method of managing a building load reduction of a plurality of loads within a building, comprising:
    assigning one or more loads of the plurality of loads to a logical group of a plurality of logical groups;
    assigning a sensitivity coefficient to each logical group of the plurality of logical groups, wherein the sensitivity coefficient is directly proportional to an impact on occupants in the building to changes in a power load of the logical group;
    determining a baseline load for each of the logical groups;
    receiving a power reduction demand response;
    reducing a power load of each logical group based upon the sensitivity coefficient and the baseline load of the logical group; and
    specifying a minimum power load for each of the logical groups, wherein the minimum power load preempts the reduced load of each logical group based upon at least one of the sensitivity coefficient and the baseline power load of the logical group, and limits the reduction of the power load of the logical group.

12. A method of managing a building load reduction of a plurality of loads within a building, comprising:
    assigning one or more loads of the plurality of loads to a logical group of a plurality of logical groups;
    assigning a sensitivity coefficient to each logical group of the plurality of logical groups, wherein the sensitivity coefficient is directly proportional to an impact on occupants in the building to changes in a power load of the logical group;
    determining a baseline load for each of the logical groups;
    receiving a power reduction demand response;
    reducing a power load of each logical group based upon the sensitivity coefficient and the baseline load of the logical group; and
    sensing occupancy of areas of each logical group, and further comprising accelerating reducing the load to logical groups that do not sense occupancy upon receiving the power reduction demand response.

13. A method of managing a building load reduction of a plurality of loads within a building, comprising:
    assigning one or more loads of the plurality of loads to a logical group of a plurality of logical groups;
    assigning a sensitivity coefficient to each logical group of the plurality of logical groups, wherein the sensitivity coefficient is directly proportional to an impact on occupants in the building to changes in a power load of the logical group;
    determining a baseline load for each of the logical groups;
    receiving a power reduction demand response;
    reducing a power load of each logical group based upon the sensitivity coefficient and the baseline load of the logical group; and
    sensing occupancy of areas of each logical group, initiating an occupancy timer upon sensing occupancy and further comprising reducing the load to a logical group upon receiving the power reduction demand response at a first rate if received during a time period of the occupancy timer, and reducing the load to the logical group upon receiving the power reduction demand response at a second rate if received after the time period of the occupancy timer, wherein the second rate is faster than the first rate.

14. A system for managing a power load reduction, comprising:
    a plurality of loads
    a demand response (DR) controller operative to:
        assign groups of one or more of the plurality of loads to logical groups;
        assign a sensitivity coefficient to each logical group of the plurality of logical groups, wherein the sensitivity coefficient is directly proportional to an impact on occupants in a building to changes in a power load of the logical group;
        determine a baseline power load for each of the logical groups;
        reduce a power load within the building upon receiving a power reduction demand response, comprising;
            reducing a power load of each logical group based upon the sensitivity coefficient and the baseline load of the logical group; wherein
            assigning the sensitivity coefficient comprises determining an impact of the power load of the logical group to users who utilize the loads of the logical group, wherein the sensitivity coefficient for each logical group is inversely related to a loss in productivity of an organization for a unit percentage reduction in a lighting load of the logical group.

15. The system of claim 14, further comprising the plurality of the loads sensing a parameter continuously over time, thereby providing re-distribution of the power loads continuously over time.

16. The system of claim 15, further comprising maintaining a power load target reduction over a target period, including continuously adapting to sensed parameter changes redistributed throughout the logical groups and power loads of the logical groups, based on the sensitivity coefficients and baseline loads of the logical groups.

17. A demand response controller, comprising:
a controller operative to:
  assign groups of one or more of the plurality of loads to logical groups;
  assign a sensitivity coefficient to each logical group of the plurality of logical groups, wherein the sensitivity coefficient is directly proportional to an impact on occupants in a building to changes in a power load of the logical group;
  determine a baseline power load for each of the logical groups;
  reduce a power load within the building upon receiving a power reduction demand response, comprising;
    reducing a power load of each logical group based upon the sensitivity coefficient and the baseline load of the logical group; wherein
  assigning the sensitivity coefficient comprises determining an impact of the power load of the logical group to users who utilize the loads of the logical group, wherein the sensitivity coefficient for each logical group is inversely related to a loss in productivity of an organization for a unit percentage reduction in a lighting load of the logical group.

18. The demand response controller of claim 17, wherein the plurality of the loads sense a parameter continuously over time, thereby allowing the demand response controller to provide re-distribution of power loads continuously over time.

19. The demand response controller of claim 18, the controller is further operative to maintain a power load target reduction over a target period, including continuously adapting to sensed parameter changes redistributed throughout the logical groups and power loads of the logical groups, based on the sensitivity coefficients and baseline loads of the logical groups.

* * * * *